US012579404B2

(12) United States Patent (10) Patent No.: US 12,579,404 B2
Matsumoto et al. (45) Date of Patent: Mar. 17, 2026

(54) PROCESSOR FOR NEURAL NETWORK, PROCESSING METHOD FOR NEURAL NETWORK, AND NON-TRANSITORY COMPUTER READABLE STORAGE MEDIUM

(71) Applicant: MegaChips Corporation, Osaka (JP)

(72) Inventors: Mahito Matsumoto, Osaka (JP); Koji Ishio, Osaka (JP); Hironobu Fujiyoshi, Kasugai (JP)

(73) Assignee: MEGACHIPS CORPORATION, Osaka (JP)

( * ) Notice: Subject to any disclaimer, the term of this patent is extended or adjusted under 35 U.S.C. 154(b) by 1104 days.

(21) Appl. No.: 17/571,542

(22) Filed: Jan. 10, 2022

(65) Prior Publication Data

US 2022/0129729 A1 Apr. 28, 2022

Related U.S. Application Data

(63) Continuation of application No. PCT/JP2020/009048, filed on Mar. 4, 2020.

(30) Foreign Application Priority Data

Jul. 12, 2019 (JP) ................................. 2019-130416

(51) Int. Cl.
*G06N 3/04* (2023.01)
*G06F 7/544* (2006.01)
(Continued)

(52) U.S. Cl.
CPC ............. *G06N 3/04* (2013.01); *G06F 7/5443* (2013.01); *G06F 17/16* (2013.01); *G06F 17/17* (2013.01)

(58) Field of Classification Search
CPC ......... G06N 3/04; G06F 7/5443; G06F 17/16; G06F 17/17
See application file for complete search history.

(56) References Cited

U.S. PATENT DOCUMENTS 9,268,683 B1 * 2/2016 Cronie .................. G06F 3/0608
10,013,628 B2 7/2018 Kato et al.
(Continued)

FOREIGN PATENT DOCUMENTS

JP 2015-197702 A 11/2015
WO 2018/016608 A1 1/2018

OTHER PUBLICATIONS

Kamiya et al., "Binary-decomposed DCNN for accelerating computation and compressing model, 2017 without retraining", (Year: 2017).*

(Continued)

*Primary Examiner* — Viker A Lamardo
*Assistant Examiner* — David H Tran
(74) *Attorney, Agent, or Firm* — XSENSUS LLP

(57) ABSTRACT

Provided is a processor for a neural network whose high-performance compact model can be incorporated into low-spec devices such as embedded devices or mobile devices without requiring re-training. The processor for a neural network, which uses a multi-valued basis matrix, widens the range of integer values that can be taken by each element of the multi-valued basis matrix; thus, the number of dimensions (the number of elements) of a scaling coefficient vector is reduced accordingly. The elements of the scaling coefficient vector are real numbers, and thus reducing the amount of processing of real number calculation processing allows for reducing the number of dimensions (the number of elements) of the scaling coefficient vector. As a result, this neural network processor significantly reduces the amount of calculation processing while ensuring the calculation accuracy when performing matrix calculation processing using the binary basis matrix.

20 Claims, 14 Drawing Sheets

(51) Int. Cl.
    *G06F 17/16*       (2006.01)
    *G06F 17/17*       (2006.01)

(56)            References Cited

U.S. PATENT DOCUMENTS

2015/0278634 A1    10/2015   Kato et al.
2019/0286982 A1*   9/2019   Ambai ..................... G06N 3/04

OTHER PUBLICATIONS

Kamiya et al., "Binary-decomposed DCNN for accelerating computation and compressing model without retraining", 2017 (Year: 2017).*

International Search Report and Written Opinion mailed on May 26, 2020, received for PCT Application PCT/JP2020/009048, Filed on Mar. 4, 2020, 8 pages including English Translation.

Kamiya et al., "Binary-Decomposed DCNN for Accelerating Computation and Compressing Model Without Retraining", Available Online at:https://arxiv.org/pdf/1709.04731.pdf, Sep. 14, 2017, pp. 1-8.

* cited by examiner

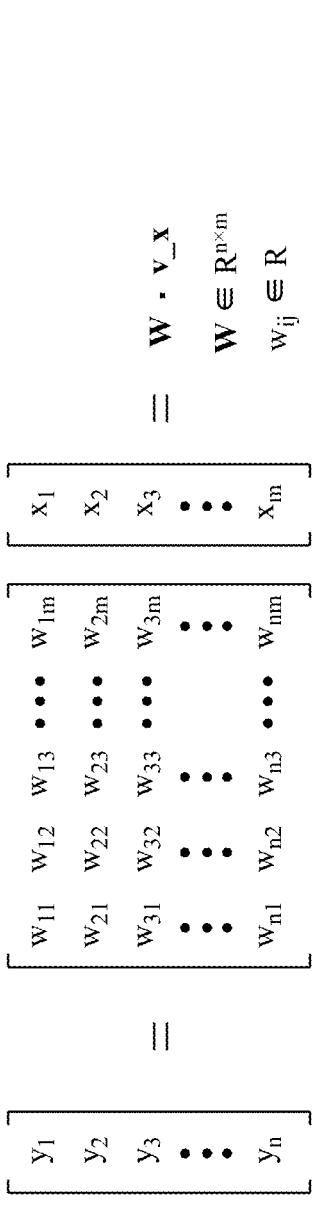

$$\begin{bmatrix} y_1 \\ y_2 \\ y_3 \\ \vdots \\ y_n \end{bmatrix} = \begin{bmatrix} w_{11} & w_{12} & w_{13} & \cdots & w_{1m} \\ w_{21} & w_{22} & w_{23} & \cdots & w_{2m} \\ w_{31} & w_{32} & w_{33} & \cdots & w_{3m} \\ \vdots & \vdots & \vdots & \cdots & \vdots \\ w_{n1} & w_{n2} & w_{n3} & \cdots & w_{nm} \end{bmatrix} \begin{bmatrix} x_1 \\ x_2 \\ x_3 \\ \vdots \\ x_m \end{bmatrix}$$

$$= \mathbf{W} \cdot v\_x$$
$$\mathbf{W} \in R^{n \times m}$$
$$w_{ij} \in R$$

CNN

CNN with Binary basis matrix $$y_1 = \begin{bmatrix} c_1 & c_2 & c_3 & \cdots & c_6 \end{bmatrix}$$

Scaling coefficient vector $$\begin{bmatrix} b_{11} & b_{12} & b_{13} & \cdots & b_{1m} \\ b_{21} & b_{22} & b_{23} & \cdots & b_{2m} \\ b_{31} & b_{32} & b_{33} & \cdots & b_{3m} \\ \vdots & \vdots & \vdots & \cdots & \vdots \\ b_{61} & b_{62} & b_{n3} & \cdots & b_{6m} \end{bmatrix}$$

Binary basis matrix $$\begin{bmatrix} x_1 \\ x_2 \\ x_3 \\ \vdots \\ x_m \end{bmatrix}$$

$$= v\_c \cdot \mathbf{M}^{(2)} \cdot v\_x$$

$$v\_c \in R^k \quad (e.g., k = 6)$$
$$\mathbf{M}^{(2)} \in \{-1, 1\}^{k \times m}$$
$$b_{ij} \in \{-1, 1\}$$

$$y_1$$

$$\cdots$$

CNN $$
\begin{bmatrix} y_1 \\ y_2 \\ y_3 \\ \vdots \\ y_n \end{bmatrix}
=
\begin{bmatrix}
w_{11} & w_{12} & w_{13} & \cdots & w_{1m} \\
w_{21} & w_{22} & w_{23} & \cdots & w_{2m} \\
w_{31} & w_{32} & w_{33} & \cdots & w_{3m} \\
\vdots & \cdots & \cdots & \cdots & \vdots \\
w_{n1} & w_{n2} & w_{n3} & \cdots & w_{nm}
\end{bmatrix}
\begin{bmatrix} x_1 \\ x_2 \\ x_3 \\ \vdots \\ x_m \end{bmatrix}
= \mathbf{W} \cdot \mathbf{v\_x}
$$

$$\mathbf{W} \in \mathbf{R}^{n \times m}$$

$$w_{ij} \in R$$

( Target value ) $\quad \begin{bmatrix} w_{11} & w_{12} & w_{13} & w_{14} & w_{15} & w_{16} & w_{17} & w_{18} \end{bmatrix} = \begin{bmatrix} 44.1 & -19.0 & -25.2 & 14.0 & 26.8 & -25.2 & 44.1 & -25.1 \end{bmatrix}$ ( In a case of Binary basis matrix ) $\quad \begin{bmatrix} w'_{11} & w'_{12} & w'_{13} & w'_{14} & w'_{15} & w'_{16} & w'_{17} & w'_{18} \end{bmatrix} = \begin{bmatrix} 44.0 & -19.8 & -25.6 & 14.6 & 26.4 & -25.6 & 44.0 & -25.6 \end{bmatrix}$ ( Norm of the difference vector between the above two vectors ) = 1.323

$$
\begin{bmatrix} w_{11} & w_{12} & w_{13} & w_{14} & w_{15} & w_{16} & w_{17} & w_{18} \end{bmatrix} =
$$

$$
\begin{bmatrix} 26 & 8.8 & 4.9 & 1 & 1 & 2.3 \end{bmatrix}
$$

Scaling coefficient vector
(Six dimensions)

$$
\begin{bmatrix}
1 & 1 & 1 & 1 & 1 & -1 \\
-1 & -1 & -1 & 1 & 1 & 1 \\
-1 & -1 & 1 & 1 & -1 & -1 \\
1 & 1 & 1 & -1 & 1 & -1 \\
1 & 1 & 1 & 1 & 1 & 1 \\
-1 & 1 & -1 & 1 & -1 & 1 \\
1 & 1 & 1 & 1 & 1 & 1 \\
1 & 1 & 1 & 1 & 1 & 1
\end{bmatrix}
= \begin{bmatrix} 44 & -19.8 & -25.6 & 14.6 & 26.4 & -25.6 & 44 & -25.6 \end{bmatrix}
$$

Binary basis matrix $\quad ( b_{ij} \in \{-1, 1\} )$

FIG. 6

CNN $$\begin{bmatrix} y_1 \\ y_2 \\ y_3 \\ \vdots \\ y_n \end{bmatrix} = \begin{bmatrix} w_{11} & w_{12} & w_{13} & \cdots & w_{1m} \\ w_{21} & w_{22} & w_{23} & \cdots & w_{2m} \\ w_{31} & w_{32} & w_{33} & \cdots & w_{3m} \\ \vdots & \vdots & \vdots & \cdots & \vdots \\ w_{n1} & w_{n2} & w_{n3} & \cdots & w_{nm} \end{bmatrix} \begin{bmatrix} x_1 \\ x_2 \\ x_3 \\ \vdots \\ x_m \end{bmatrix} = \mathbf{W} \cdot \mathbf{v\_x}$$

$$\mathbf{W} \in \mathbf{R}^{n \times m}$$
$$w_{ij} \in \mathbf{R}$$

(Target value)
$$\begin{bmatrix} w_{11} & w_{12} & w_{13} & w_{14} & w_{15} & w_{16} & w_{17} & w_{18} \end{bmatrix} = \begin{bmatrix} 44.1 & -19.0 & -25.2 & 14.0 & 26.8 & -25.2 & 44.1 & -25.1 \end{bmatrix}$$

(In a case of N-value basis matrix) (N = 4)
$$\begin{bmatrix} w''_{11} & w''_{12} & w''_{13} & w''_{14} & w''_{15} & w''_{16} & w''_{17} & w''_{18} \end{bmatrix} = \begin{bmatrix} 44.2 & -18.2 & -25.0 & 13.3 & 27.0 & -25.0 & 44.2 & -25.0 \end{bmatrix}$$

( Norm of the difference vector between the above two vectors ) = 1.131

$$\begin{bmatrix} w_{11} & w_{12} & w_{13} & w_{14} & w_{15} & w_{16} & w_{17} & w_{18} \end{bmatrix} = \begin{bmatrix} 26 & 8.8 & 4.9 \end{bmatrix} \begin{bmatrix} 2 & -1 & -1 & 1 & 2 & -1 & 2 & -1 \\ -2 & 2 & -1 & -2 & -1 & -1 & -2 & -1 \\ 2 & -2 & 2 & 2 & 1 & 2 & 2 & 2 \end{bmatrix} = \begin{bmatrix} 44.2 & -18.2 & -25.0 & 13.3 & 27.0 & -25.0 & 44.2 & -25.0 \end{bmatrix}$$

Scaling coefficient vector (three dimensions)

N-value basis matrix ( N = 4 )
( $d_{ij} \in \{-2, -1, 1, 2\}$ )

FIG. 7

Code table (for 4-value basis matrix)

| Bit pattern | | Value |
|---|---|---|
| 0 | 0 | 2 |
| 0 | 1 | 1 |
| 1 | 0 | -2 |
| 1 | 1 | -1 |

FIG. 8

Code table (for 8-value basis matrix)

| Bit pattern | Value |
|-------------|-------|
| 0 0 0 | 4 |
| 0 0 1 | 3 |
| 0 1 0 | 2 |
| 0 1 1 | 1 |
| 1 0 0 | -1 |
| 1 0 1 | -2 |
| 1 1 0 | -3 |
| 1 1 1 | -4 |

Codeword usage rate : 100%

Code table (for 3-value basis matrix)

| Bit pattern | Value |
|-------------|-------|
| 0 0 | — |
| 0 1 | 1 |
| 1 0 | 0 |
| 1 1 | -1 |

Codeword usage rate : 75%

FIG. 13

PROCESSOR FOR NEURAL NETWORK, PROCESSING METHOD FOR NEURAL NETWORK, AND NON-TRANSITORY COMPUTER READABLE STORAGE MEDIUM

CROSS-REFERENCE TO RELATED APPLICATIONS

This application is a Bypass continuation of PCT filing PCT/JP2020/009048, filed Mar. 4, 2020, and claims priority to Japanese Application No. 2019-130416, filed Jul. 12, 2019, the entire contents of each are incorporated herein by reference.

TECHNICAL FIELD

The present invention relates to technology for neural networks.

BACKGROUND ART

In recent years, various techniques using CNN (Convolutional Neural Network), which is one of technology for neural networks, have been developed (see, for example, Patent Document 1). Among CNNs, the technology using DCNN (Deep Convolutional Neural Network) with many intermediate layers, which achieved good results in various fields, has been attracting particular attention.

PRIOR ART DOCUMENTS

Patent Document 1: Japanese Unexamined Patent Publication No. 2015-197702

DISCLOSURE OF INVENTION

Technical Problem

DCNN achieves high recognition performance in various tasks such as general object recognition and semantic segmentation. On the other hand, DCNN, in which the amount of calculation and the number of parameters required to perform processing are very large, requires a huge amount of processing time and a large amount of memory when performing the processing.

Further, in DCNN, there is a tendency that the recognition accuracy is improved by making layers deeper, which causes a problem that the recognition time (processing time) and the model size are both increased. To use DCNN in low-spec devices such as embedded devices and mobile devices, speeding up calculation for recognition and compression of model sizes are major issues.

In other words, it is difficult to incorporate a trained model obtained by training with a large-scale system into low-spec devices such as embedded devices and mobile devices (for example, edge terminals); for low-spec devices, building a compact model is needed.

To incorporate a trained model obtained by training with a large-scale system into low-spec devices (for example, edge terminals) such as embedded devices or mobile devices, it is necessary to build a compact model corresponding to the trained model in the low-spec device and to train again the compact model using the training data used for the trained model (this training is referred to as "re-training").

In other words, there is a problem that re-training is required in order to incorporate a trained model obtained by training with a large-scale system into low-spec devices (for example, edge terminals) such as embedded devices or mobile devices.

To solve the above problems, it is an object of the present invention to provide a processor, a processing method, and a program for a neural network whose high-performance compact model can be incorporated into low-spec devices (for example, edge terminals) such as embedded devices or mobile devices without requiring re-training.

Solution to Problem

To solve the above problems, a first aspect of the present invention provides a processor for a neural network (a neural network processor) for performing multi-valued neural network processing including convolution layer processing and fully connected layer processing, including a control circuitry, a quantization processing circuitry, and a dot product processing circuitry.

The control circuitry sets a scaling coefficient vector, which is real number vector data, and a multi-valued basis matrix whose elements are multi-valued data.

The quantization processing circuitry performs quantization processing on a feature map inputted into the convolution layer and a feature vector inputted into the fully connected layer. Further, the quantization processing circuitry sets an offset value such that a minimum value of the feature map and a minimum value of the feature vector is smaller than a predetermined value, and performs the quantization processing using a quantization width obtained based on the maximum value and the minimum value of the feature map and the maximum value and the minimum value of the feature vector.

The dot product processing circuitry performs matrix calculation processing using a scaling coefficient vector having the number of elements smaller than the number of elements of the scaling coefficient vector required to achieve a predetermined approximation accuracy when using a binary basis matrix, and a multi-valued basis matrix that is set corresponding to the scaling coefficient vector.

The processor for a neural network, which uses a multi-valued basis matrix, widens the range of integer values that can be taken by each element of the multi-valued basis matrix; thus the number of dimensions (the number of elements) of the scaling coefficient vector is reduced accordingly. The elements of the scaling coefficient vector are real numbers, and thus reducing the amount of processing of real number calculation processing allows for reducing the number of dimensions (the number of elements) of the scaling coefficient vector. As a result, the processor for a neural network significantly reduces the amount of calculation processing while ensuring the calculation accuracy when performing matrix calculation processing using the binary basis matrix.

In other words, the processor 100 for a neural network, by using the multi-valued basis matrix, reduces the number of the scaling coefficient vector and reduces the amount of real number processing, thus allowing high-accuracy calculation processing to be performed efficiently. Thus, using the processor for a neural network allows a high-performance compact model to be incorporated into low-spec devices (for example, edge terminals) such as embedded devices and mobile devices without the need for re-training.

The "predetermined approximation accuracy" means that, for example, the difference between X1 and X2 is within a predetermined range (within the permissible range of error) assuming (1) when a predetermined matrix M1 is vector-decomposed and approximated using the scaling coefficient vector and the binary basis matrix, the difference between the matrix M1, which is the target value, and the matrix obtained by the scaling coefficient vector and the binary basis matrix obtained by vector decomposition (for example, the sum of the squared averages of the differences of each element) is set to X1, and (2) when the predetermined matrix M1 is vector-decomposed and approximated using the scaling coefficient vector and the multi-valued basis matrix, the difference between the matrix M1, which is the target value, and the matrix obtained by the scaling coefficient vector and the multi-valued basis matrix obtained by vector decomposition (for example, the sum of the squared averages of the differences of each element) is set to X2. Further, "the difference between X1 and X2 is within a predetermined range (within the permissible range of error)" means that, for example, assuming the sum of the squared averages of the values of each element of the matrix M1, which is the target value, is set to Z1, the above-described X1 is set to the sum of the squared averages of the differences of each element (of the matrix), and the above-described X2 is set to the sum of the squared averages of the differences of each element (of the matrix), the following formula is satisfied.

$$\text{Abs}(X1-X2)/Z1 < Th1$$

Abs(x): A function that takes the absolute value of x

Th1 is, for example, any real number of 0.5 or less.

Further, the "matrix calculation processing" includes dot product calculation processing (a process for obtaining the dot product of two vectors).

A second aspect of the present invention provides the processor for a neural network of the first aspect of the present invention in which the dot product processing circuitry includes an interface circuitry, a mode setting circuitry, an integer processing circuitry, and a real number processing circuitry.

The interface circuitry inputs data of elements of the multi-valued basis matrix, and is connected to a bus having an N1 bit width where N1 is a natural number.

The mode setting circuitry sets a mode to be set according to the number of possible values of the elements of the multi-valued basis matrix.

The integer calculation processing circuitry performs integer calculation processing on data after quantization processing and data consisting of a predetermined number of elements included in the multi-valued basis matrix, based on the mode set by the mode setting circuitry.

The real number processing circuitry performs real number calculation processing on data obtained by performing the integer calculation processing and the scaling coefficient vector.

The processor for a neural network allows integer calculation processing to be performed according to the bus width (N1 bit) of the interface unit and the mode set by the mode setting circuitry. This increases the occupancy rate of the effective data in the bus width of the data transfer bus in the processor for a neural network, thus allowing the calculation processing to be efficiently.

A third aspect of the present invention provides the processor for a neural network of the second aspect of the present invention in which the integer processing circuitry includes a code table holding circuitry and a decoder.

The code table holding circuitry holds a code table in which data of elements included in the multi-valued basis matrix is assigned to codewords that are integer values.

The decoder decodes into a codeword that is an integer value corresponding to the data of the elements included in the multi-valued basis matrix based on the code table held by the code table holding circuitry.

The integer processing circuitry performs the integer calculation processing using the integer values corresponding to the data of the elements included in the multi-valued basis matrix decoded by the decoder and the data after quantization processing.

This allows the processor for a neural network to flexibly set the integer values (codewords) taken by each element of the multi-value (N-value) basis matrix using the code table, thus allowing various matrix calculation processing to be performed efficiently.

A fourth aspect of the present invention provides the processor for a neural network of the third aspect of the present invention in which the interface circuitry is capable of inputting data for setting a code table, and outputs the data for setting the code table to the code table holding circuitry.

The code table holding circuitry holds a code table specified by the code table setting data inputted from the interface circuitry.

As a result, the processor for a neural network, for example, receives a code table setting data from the outside to the dot product processing circuitry, thereby allowing for setting various code tables. This allows the processor for a neural network to efficiently perform high-accuracy processing while having flexibility.

A fifth aspect of the present invention provides the processor for a neural network of any one of the second to the fourth aspects of the present invention in which the dot product processing circuitry further includes a loop count obtaining circuitry that determines the number of integer integration loops, which is the number of repetitions of integer integration processing of the integer calculation processing, based on the number of bits of the bus width of the interface circuitry and the total number of bits of the data of the elements of the multi-valued base matrix inputted into the interface circuitry at one time.

The integer processing circuitry repeatedly performs the integer integration processing of the integer calculation processing in accordance with the integer integration loop number determined by the loop count obtaining circuitry.

This allows the processor for a neural network to obtain correct calculated value by performing the integer integration processing repeatedly even when the total number of bits of the data of the elements of the multi-valued basis matrix inputted into the interface circuitry at one time exceeds the number of bits of the bus width of the interface circuitry.

A sixth aspect of the present invention provides the fifth aspect of the present invention in which the loop count obtaining circuitry determines the number of the real number integration loops, which is the number of repetitions of the real number calculation processing, based on the number of dimensions of the scaling coefficient vector inputted into the interface circuitry.

The real number processing circuitry repeatedly performs the real number integration processing of the real number calculation processing in accordance with the number of real number integration loops determined by the loop count obtaining circuitry.

This allows the processor for a neural network to appropriately perform real number calculation processing regardless of the number of dimensions of the scaling coefficient vector.

A seventh aspect of the present invention provides a processing method for a neural network for performing multi-valued neural network processing including convolution layer processing and fully connected layer processing, including a control step, a quantization processing step, a quantization processing step, and a dot product processing step.

The control step sets a scaling coefficient vector, which is real number vector data, and a multi-valued basis matrix whose elements are multi-valued data.

The quantization processing step performs quantization processing on a feature map inputted into the convolution layer and a feature vector inputted into the fully connected layer. The quantization processing step sets an offset value such that a minimum value of the feature map and a minimum value of the feature vector is smaller than a predetermined value, and performs the quantization processing using a quantization width obtained based on the maximum value and the minimum value of the feature map and the maximum value and the minimum value of the feature vector.

The dot product processing step performs matrix calculation processing using a scaling coefficient vector having the number of elements smaller than the number of elements of the scaling coefficient vector required to achieve a predetermined approximation accuracy when using a binary basis matrix, and a multi-valued basis matrix that is set corresponding to the scaling coefficient vector.

This achieves the processing method for a neural network having the same advantageous effects as the processor for a neural network of the first aspect of the present invention.

An eighth aspect of the present invention provides a non-transitory computer readable storage medium storing a program for causing a computer to execute the processing method for a neural network according to the seventh aspect of the present invention.

This achieves the non-transitory computer readable storage medium storing the program for causing a computer to execute the processing method for a neural network having the same advantageous effects as the processor for a neural network of the first aspect of the present invention.

Advantageous Effects

The present invention provides a processor, a processing method, and a program for a neural network whose high-performance compact model can be incorporated into low-spec devices (for example, edge terminals) such as embedded devices or mobile devices without requiring re-training.

BRIEF DESCRIPTION OF DRAWINGS

FIG. 4 is a diagram including a diagram in which weight calculation processing of CNN is represented using a matrix (upper figure) and a diagram in which weight calculation processing of a binarized neural network is represented using a matrix (lower figure).

FIG. 6 is a diagram for explaining a scaling coefficient vector v_c (=[c1, c2, C6]) and setting processing for a binary basis matrix M.

FIG. 7 is a diagram for explaining setting processing for a scaling coefficient vector v_c (=[c1, c2, c3]) and an N-value basis matrix M (N) (N=4).

FIG. 8 is a diagram showing a code table (for a 4-value basis matrix) (an example).

FIG. 13 is a diagram showing a code table (an example).

DESCRIPTION OF EMBODIMENTS

First Embodiment

A first embodiment will now be described with reference to the drawings.

1.1: Configuration of Neural Network Processor

Figure 1:
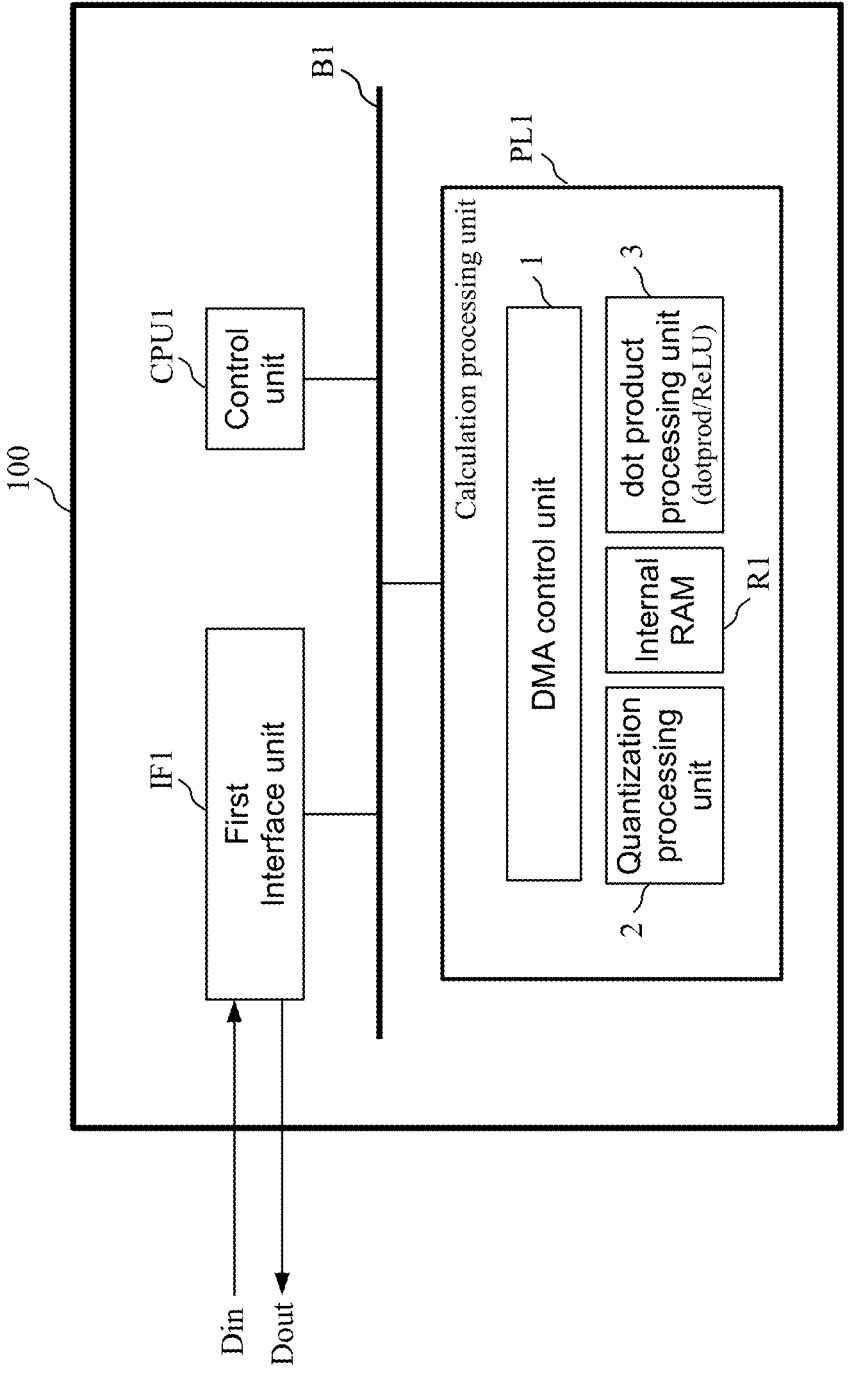
FIG. 1 is a schematic configuration diagram of a neural network processor 100 (a processor for a neural network) according to a first embodiment.

FIG. 1 is a schematic configuration diagram of a neural network processor 100 (a processor for a neural network) according to the first embodiment.

Figure 2:
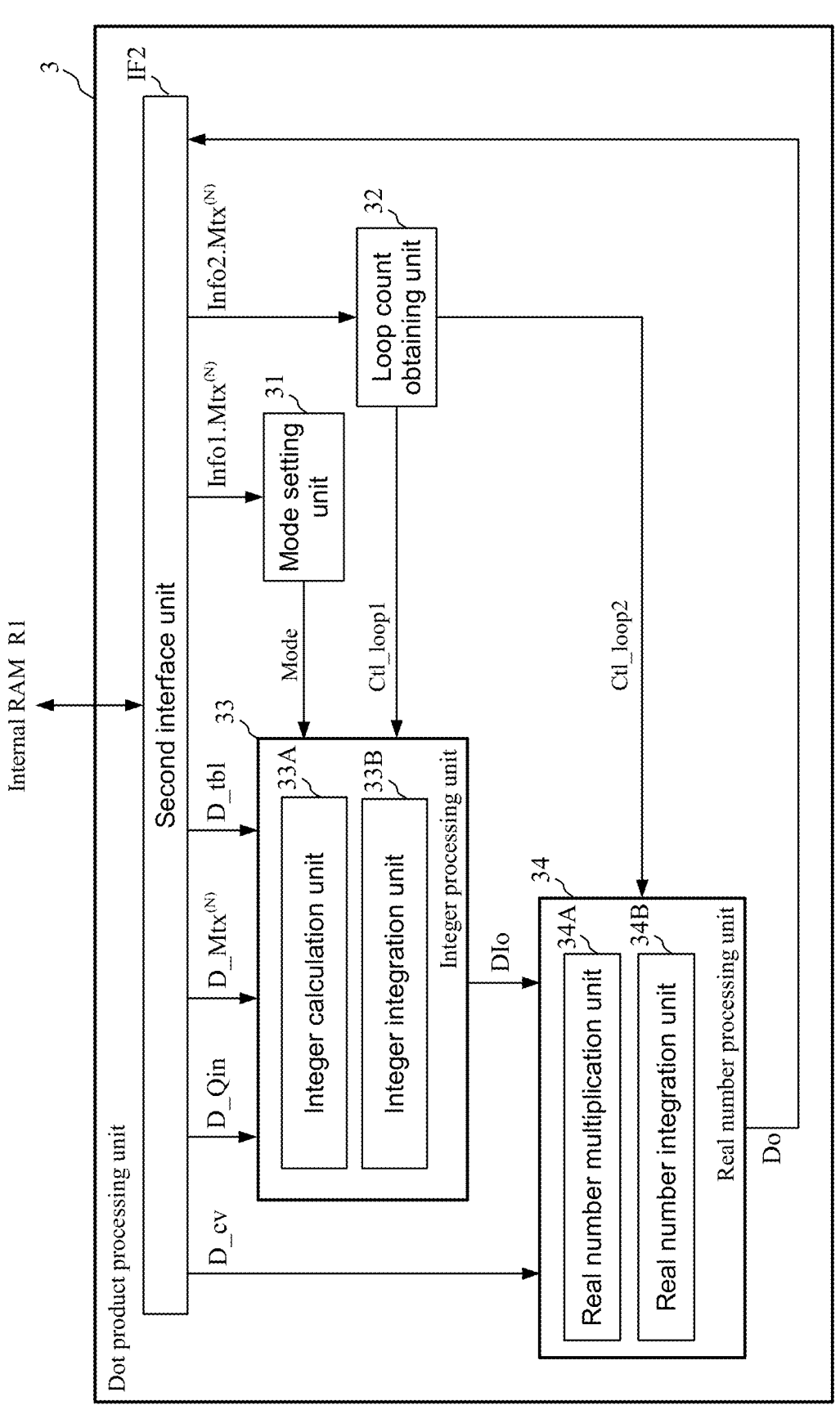
FIG. 2 is a schematic configuration diagram of a dot product processing unit 3 according to the first embodiment.
Figure 3:
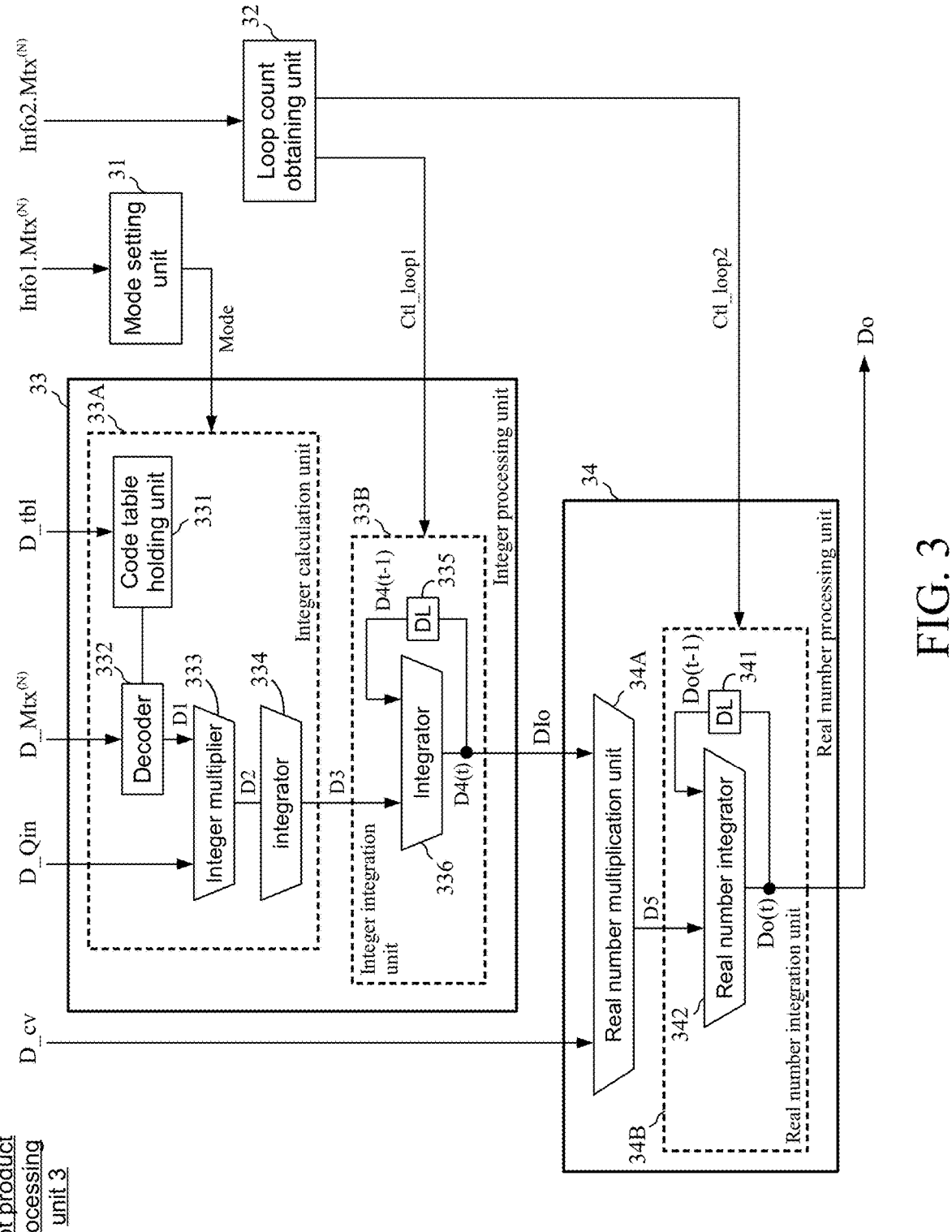
FIG. 3 is a schematic configuration diagram of a dot product processing unit 3 according to the first embodiment.

FIGS. 2 and 3 are schematic configuration diagrams of the dot product processing unit 3 according to the first embodiment.

As shown in FIG. 1, the neural network processor 100 includes a first interface unit IF1, a control unit CPU1, a calculation processing unit PL1, and a bus B1. As shown in FIG. 1, the first interface unit IF1, the control unit CPU1, and the calculation processing unit PL1 are connected by the bus B1, and necessary data, commands, and the like are inputted/outputted via the bus B1. It should be noted that a part or all of the above functional parts may be directly connected as needed, instead of being connected by bus.

The first interface unit IF1 receives data Din to be processed from the outside, and transmits the data including the processing result by the neural network processor to the outside as the data Dout.

The control unit CPU 1 performs overall control of the neural network processor 100, performs control of each functional unit, and performs processing necessary for neural network processing. The control unit CPU 1 is achieved with a CPU (Central Processing Unit) or a CPU core.

The control unit CPU1 obtains (sets) a scaling coefficient vector v_c and a multi-valued basis matrix M that, for example, approximate parameters (weighted data) of a trained model in a large-scale system, and stores and holds the obtained scaling coefficient vector v_c and the obtained multi-valued basis matrix M in an area AR(CV) of an internal RAM R1 and an area AR(MMtx) of the internal RAM R1, respectively.

The scaling coefficient vector v_c and the multi-valued basis matrix M may be inputted to the neural network processor 100 from the outside via the first interface unit IF1.

As shown in FIG. 1, the calculation processing unit PL1 includes a DMA control unit 1, a quantization processing unit 2, an internal RAM R1, and a dot product processing unit 3.

The DMA control unit 1 performs DMA transfer processing (DMA: Direct Memory Access).

The quantization processing unit 2 performs quantization processing on data of the feature map which is the input of the convolutional layer of a DCNN (Deep Convolution Natural Network). Further, the quantization processing unit 2 performs quantization processing on the input data of a fully connected layer of the DCNN.

The internal RAM R1 is a RAM (Random Access Memory) for storing and holding data necessary for performing neural network processing.

As shown in FIG. 2, the dot product processing unit 3 includes a second interface unit IF2, a mode setting unit 31, a loop count obtaining unit 32, an integer processing unit 33, and a real number processing unit 34.

The second interface unit IF2 is an interface with the internal RAM R1. The second interface unit IF2 reads out data from the internal RAM R1 and/or writes data to the internal RAM R1. Further, the second interface unit IF2 obtains data from data that has been read from the internal RAM R1, and transmits the obtained data to the mode setting unit 31, the loop count obtaining unit 32, the integer processing unit 33, and/or the real number processing unit 34. Further, the second interface unit IF2 receives data transmitted from the real number processing unit 34, and writes the data into a predetermined area of the internal RAM R1.

The mode setting unit 31 receives data Info1.Mtx$^{(N)}$ that is transmitted from the second interface unit IF2 and includes information for mode setting. The mode setting unit 31 then generates a mode signal model based on the data Info1.Mtx$^{(N)}$, and transmits the generated mode signal model to the integer processing unit 33.

The loop count obtaining unit 32 receives data Info2.Mtx$^{(N)}$ that is transmitted from the second interface unit IF2, and includes (1) information for determining the number of loops in integer integration processing performed by the integer processing unit 33 and (2) information for determining the number of loops in real number integration processing performed by the real number processing unit 34. Based on data Info2.Mtx$^{(N)}$, the loop count obtaining unit 32 generates (1) a control signal Ctrl_loop1 for controlling the number of loops in the integer integration processing performed by the integer processing unit 33 and (2) a control signal Ctl_loops2 for controlling the number of loops in the real number integration processing performed by the real number processing unit 34. The loop count obtaining unit 32 then transmits the control signal Ctrl_loop1 to the integer processing unit 33, and transmits the control signal Ctrl_loop2 to the real number processing unit 34.

As shown in FIG. 2, the integer processing unit 33 includes an integer calculation unit 33A and an integer integration unit 33B.

As shown in FIG. 3, the integer calculation unit 33A includes a code table holding unit 331, a decoder 332, an integer multiplier 333, and an integrator 334. The integer calculation unit 33A receives the mode signal model transmitted from the mode setting unit 31, and sets a processing mode in accordance with the mode signal model. The integer calculation unit 33A then performs decoding processing, integer multiplication processing, and integration processing in accordance with the set processing mode.

The code table holding unit 331 receives data of the code table transmitted from the second interface unit IF2, and holds the data of the code table.

The decoder 332 receives the multi-value matrix data D_Mtx$^{(N)}$ transmitted from the second interface unit IF2. The decoder 332 refers to the code table held by the code table holding unit 331, performs decoding processing on the multi-value matrix data D_Mtx$^{(N)}$, and obtains data after the decoding processing as data D1. The decoder 332 then transmits the data D1 to the integer multiplier 333.

The integer multiplier 333 receives the data D_Qin after quantization processing transmitted from the second interface unit IF2 and the data D1 transmitted from the decoder 332. The integer multiplier 333 performs integer multiplication processing on the data D_Qin and the data D1 to obtain the data after the integer multiplication processing as the data D2. The integer multiplier 333 then transmits the obtained data D2 to the integrator 334.

The integrator 334 receives the data D2 transmitted from the integer multiplier 333, performs integration processing on the data D2, and transmits the data after the integration processing as the data D3 to the integer integration unit 33B.

As shown in FIG. 3, the integer integration unit 33B includes a delay device 335 and an integrator 336. The integer integration unit 33B receives the control signal Ctrl_loop1 transmitted from the loop count obtaining unit 32. The integer integration unit 33B performs integration processing (loop processing) for the number of loops instructed by the control signal Ctrl_loop1.

The delay device 335 receives the output data D4 of the integrator 336 (this is referred to as the data D4(t) at the current time t), holds the received data D4 (t), and transmits held data the integrator 336 when the integrator 336 performs the next calculation processing (this timing is referred to as time t+1). In other words, the delay device 335 transmits the one-timestep previous output data of the integrator 336 (this is referred to as data D4(t−1)) to the input of the integrator 336 at the time t. Note that an initial value of the data D4(t−1) is "0".

The integrator 336 receives the data D3 transmitted from the integer calculation unit 33A and the data D4(t−1) transmitted from the delay device 335. The integrator 336 then performs integration processing on the data D3 and the data D4(t−1), and transmits the data after the integration processing as the data DIo (=D4(t)) to the real number processing unit 34.

As shown in FIGS. 2 and 3, the real number processing unit 34 includes a real number multiplication unit 34A and a real number integration unit 34B.

The real number multiplication unit 34A receives the scaling coefficient vector data D_cv transmitted from the second interface unit IF2 and the data DIo transmitted from the integer processing unit 33. The real number multiplication unit 34A performs real number multiplication processing on the scaling coefficient vector data D_cv and the data DIo, and transmits the data after the real number multiplication processing as the data D5 to the real number integration unit 34B.

As shown in FIG. 3, the real number integration unit 34B includes a delay device 341 and a real number integrator 342. The real number integration unit 34B receives the control signal Ctrl_loop2 transmitted from the loop count obtaining unit 32. The real number integration unit 34B performs integration processing (loop processing) for the number of loops instructed by the control signal Ctrl_loop2.

The delay device 341 receives the output data Do of the real number integrator 342 (this is referred to as the data Do(t) at the current time t), holds the received data Do(t), and transmits the held data to the real number integrator 342 when the real number integrator 342 performs the next calculation processing (this timing is referred to as time t+1). In other words, the delay device 341 transmits the one-timestep previous output data of the real number integrator 342 (this is referred to as data Do(t−1)) to the input of the real number integrator 342 at time t. Note that an initial value of the data Do(t−1) is "0".

The real number integrator 342 receives the data D5 transmitted from the real number multiplication unit 34A and the data Do(t−1) transmitted from the delay device 341. The real number integrator 342 performs integration processing on the data D5 and the data Do(t−1), and transmits the data after the integration processing as the data Do (=Do(t)) to the second interface unit IF2.

1.2: Operation of Neural Network Processor>

The operation of the neural network processor 100 configured as described above will be described below.

Generally, a CNN includes an input layer, convolutional layers, and a fully connected layer. For example, image data is inputted as input data Din into the first interface unit IF1 of the neural network processor 100, image recognition processing by CNN is executed, and the image recognition processing result is outputted to the outside as output data Dout.

The CNN performs weight calculation processing on the input data in processing of the convolution layer or processing of the fully connected layer, and then performs processing using an activation function (for example, ramp function (ReLU: Rectifier Linear Unit), sigmoid function, softmax function, or the like) on the result of the processing, thereby obtaining output data of the convolution layer or the fully connected layer.

Further, as disclosed in the following prior art document A, Binarized-DCNN (DCNN: Deep Convolution Natural Network) (hereinafter referred to as "BNN") introduces a binary decomposition of a quantization sub-layer and coupling coefficients and replaces the dot product calculation between real numbers with the dot product calculation between binary values, thereby achieving high-speed recognition calculation and compression of model sizes without re-training for existing network models. BNN binary operations, which can be performed with logical operations such as XOR and bit count, achieves high-speed calculation.

Prior Art Document A

Ryuji Kamiya et al. "Speeding up recognition calculation and model compression by Binarized-DCNN" Shingaku Giho 116 (366), 47-52, Dec. 15, 2016, the Institute of Electronics, Information and Communication Engineers.

Based on the disclosure of the above-mentioned prior art document A, the basic formula of the recognition calculation of BNN can be derived as the following Formula 1.

$$y_{ijn}=c_n^T M_n^T B_{ij} r_{ij}+\min(x)\text{Offset} \qquad \text{Formula 1:}$$

$y_{ijn}$: Output of an n-th feature map (output value of the coordinates (i, j) of a feature map)

$c_n^T$: Transposed matrix of scaling coefficient vector $c_n$ of the n-th feature map $M_n^T$: Transposed matrix of the binary basis matrix of the n-th feature map $B_{ij} r_{ij}$: Binary feature map (binary feature map after quantization)

min (x): The minimum value among the values of individual elements of the n-th feature map Offset: Data for offset adjustment Further, since $M_n^T \in \{-1, 1\}$ and $B_{ij} r_{ij} \in \{0, 1\}$ are binary values, they can be calculated by logical operation and bit count using the following Formula 2.

$$M_n^T B_{ij} r_{ij}=2\times\text{BITCNT}(\text{AND}(M_n^T, B_{ij} r_{ij}))-\text{Norm}(z) \qquad \text{Formula 2:}$$

$z=B_{ij} r_{ij}$

Norm(z): Function to get the norm of z

BITCNT(x): A function that counts the number of bits that are "1" in the binary code x.

In the neural network processor 100 of the present embodiment, the possible values of the elements of the basis matrix of the feature map are set to multiple values (N values, N is a natural number of two or more). In other words, the neural network processor 100 uses a multi-value (N-value) basis matrix as the basis matrix of the feature map. This allows the neural network processor 100 to ensure the accuracy of CNN processing even when the number of elements of the scaling coefficient vector of the feature map is reduced.

The basic formula of the recognition calculation of the multi-valued neural network can be derived as the following Formula 3.

$$y_{ijn}=c_n^T M_n^{(N)T} B_{ij} r_{ij}+\min(x)\text{offset} \qquad \text{Formula 3:}$$

$y_{ijn}$: Output of the n-th feature map (output value of the coordinates (i, j) of the feature map)

$c_n^T$: Transposed matrix of scaling coefficient vector $c_n$ of the n-th feature map $M_n^{(N)T}$: Transposed matrix of the multi-valued (N-valued) basis matrix of the n-th feature map $B_{ij} r_{ij}$: Binary feature map (binary feature map after quantization)

min(x): The minimum value among the values of individual elements of the n-th feature map Offset: Data for offset adjustment Here, it will be described that the neural network processor 100 of the present embodiment achieves the same calculation accuracy (CNN processing accuracy) as when BNN is used.

For convenience of explanation, a case of N=4 (a case when a 4-value basis matrix is used) will be described.

FIG. 4 is a diagram including a diagram in which the weight calculation processing of CNN is represented using a matrix (upper figure) and a diagram in which the weight calculation processing of the binarized neural network is represented using a matrix (lower figure).

Figure 5:
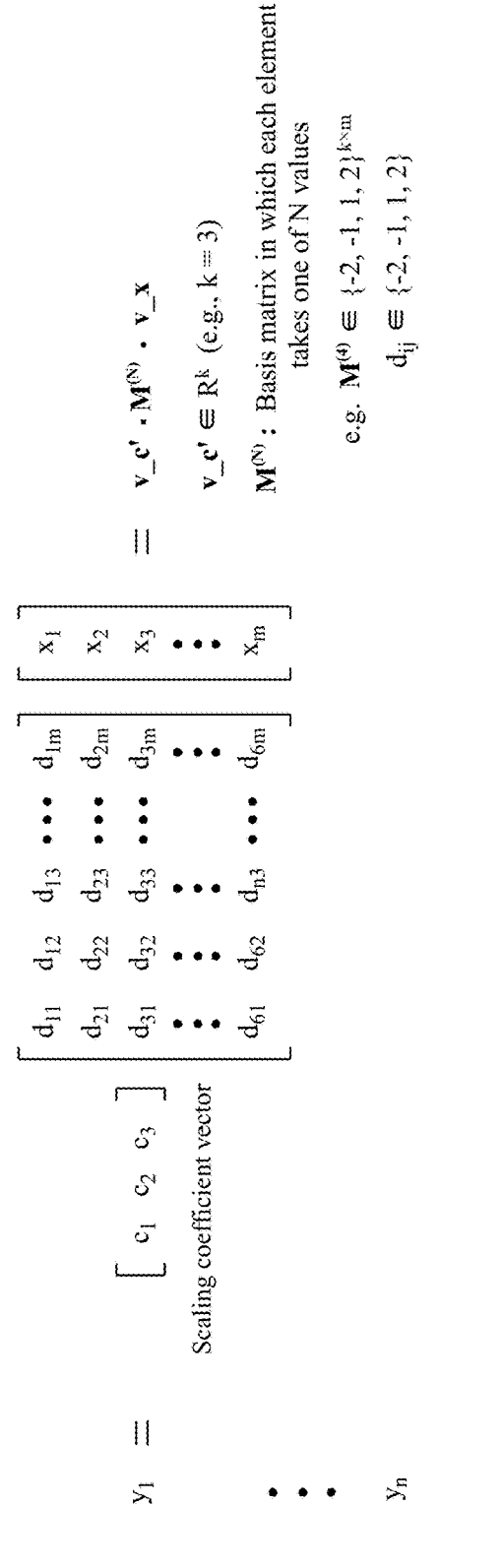
FIG. 5 is a diagram including a diagram in which weight calculation processing of CNN is represented using a matrix (upper figure) and a diagram in which weight calculation processing of a multi-valued neural network is represented using a matrix (lower figure).

FIG. 5 is a diagram including a diagram in which the weight calculation processing of CNN is represented using a matrix (upper figure) and a diagram in which the weight calculation processing of the multi-valued neural network is represented using a matrix (lower figure).

As shown in the upper figure of FIG. 4, in the CNN weighting operation, finding a product of the matrix W (n×m matrix) in which each element $w_{ij}$ is a real number and the input data (vector v_x (1×m matrix)) causes the output data y (1×m matrix) to be obtained.

Conversely, as shown in the lower figure of FIG. 4, in the weight calculation processing of the binarized neural network, finding a product of (1) the scaling coefficient vector v_c (=$[c_1, c_2, \ldots, c_6]$) (Here, as an example, the number of dimensions of the scaling coefficient vector is six) in which each element is a real number, (2) a binary basis matrix M in which each element is "−1" or "1", and (3) input data v_x (=$[x_1, x_2, \ldots, x_m]$) causes the output data y1 to be obtained. Performing the same processing as above for $y_2$ to $y_n$ causes the output data y (1×m matrix) to be obtained.

As shown in the lower figure of FIG. 5, in the weight calculation processing of the multi-valued neural network, finding a product of (1) the scaling coefficient vector v_c (=[$c_1$, $c_2$, . . . , $c_3$]) (here, as an example, the number of dimensions of the scaling coefficient vector is three) in which each element is a real number, (2) a multi-valued basis matrix (N-value basis matrix) M(N) in which each element takes one of N values, and (3) input data v_x (=[$x_1$, $x_2$, . . . , $x_m$]) causes the output data y1 to be obtained. Performing the same processing as above for $y_2$ to $y_n$ causes the output data y (1×m matrix) to be obtained.

Here, as an example, we assume a case where a CNN weight matrix, that is, a vector whose elements are the elements of the first row of the matrix W (n×m matrix) in which each element $w_{ij}$ is a real number is as follows:

$$[w_{11},w_{12},w_{13},w_{14},w_{15},w_{16},w_{17},w_{18}]=[44.1,-19.0,-25.2,14.0,26.8,-25.2,44.1,-25.1]$$

(Vector shown as "target value" in FIGS. 6 and 7).

In the above case, a case where (1) an approximation vector obtained when the scaling coefficient vector and the binary basis matrix are used, and (2) an approximation vector obtained when the scaling coefficient vector and the N-value basis matrix (N=4) are used will now be described.

FIG. 6 is a diagram for explaining the setting processing of the scaling coefficient vector v_c (=[$c_1$, $c_2$, . . . , $c_6$]) and the binary basis matrix M. For convenience of explanation, m=8 is used.

We assume an exemplary case in which, in a large-scale system, when training is performed and the weight matrix W is obtained, as shown in FIG. 6, data in the first row of the weight matrix W is as follows:

$$vec1\_target=[w_{11},w_{12},w_{13},w_{14},w_{15},w_{16},w_{17},w_{18}]=[44.1,-19.0,-25.2,14.0,26.8,-25.2,44.1,-25.1]$$

(Vector Shown as "Target Value" in FIG. 6)"

(The above vector is referred to as a target vector vec1_target).

In the above case, if the scaling coefficient vector (six-dimensional vector) and the binary basis matrix are set to the values shown in the lower part of FIG. 6, data of the first row of the weight matrix W obtained by the training in the large-scale system can be reproduced (approximated).

In this case, the data in the first row of the weight matrix W (referred to as the vector $vec1\_cv6\_Mtx^{(2)}$) can be approximated to:

$$vec1\_cv6\_Mtx^{(2)}=[w'_{11},w'_{12},w'_{13},w'_{14},w'_{15},w'_{16},w'_{17},w'_{18}]=[44.0,-19.8,-25.6,14.6,26.4,-25.6,44.0,-25.6]$$

For the approximation accuracy, the norm of the difference vector between a target vector vec1_taget, which is target data for the data in the first row of the weight matrix W, and the vector $vec1\_cv6\_Mtx^{(2)}$, which is data of the first row of the weight matrix W obtained using the scaling coefficient vector (six-dimensional vector) and the binary basis matrix, is as follows.

$$Norm(vec1\_target-vec1\_cv6\_Mtx^{(2)}) \approx 1.323$$

Norm(vc_x): Function to get the norm (Euclidean distance) of the vector vc_x

FIG. 7 is a diagram for explaining the setting processing of the scaling coefficient vector v_c (=[$c_1$, $c_2$, $c_3$]) and the N-value basis matrix $M^{(N)}$ (N=4). For convenience of explanation, m=8 is used.

We assume an exemplary case in which, in a large-scale system, when training is performed and the weight matrix W is obtained, as shown in FIG. 7, data in the first row of the weight matrix W is as follows:

$$vec1\_target=[w_{11},w_{12},w_{13},w_{14},w_{15},w_{16},w_{17},w_{18}]=[44.1,-19.0,-25.2,14.0,26.8,-25.2,44.1,-25.1]$$

(Vector shown as "target value" in FIG. 7 (target vector vec1_taget)).

In the above case, if the scaling coefficient vector (three-dimensional vector) and the N-value basis matrix (N=4) are set to the values shown in the lower part of FIG. 7, the weight matrix W obtained by training in the large-scale system can be reproduced (approximated).

In this case, the data in the first row of the weight matrix W (referred to as the vector $vec1\_Mtx^{(4)}$) can be approximated to:

$$vec1\_cv3\_Mtx^{(4)}=[w''_{11},w''_{12},w''_{13},w''_{14},w''_{15},w''_{16},w''_{17},w''_{18}]=[44.2,-18.2,-25.0,13.3,27.0,-25.0,44.2,-25.0]$$

For the approximation accuracy, the norm of the difference vector between a target vector vec1_taget, which is target data for the data in the first row of the weight matrix W, and the vector $vec1\_cv3\_Mtx^{(4)}$, which is data of the first row of the weight matrix W obtained using the scaling coefficient vector (three-dimensional vector) and the N-value basis matrix (N=4), is as follows.

$$Norm(vec1\_target-vec1\_cv3\_Mtx^{(4)}) \approx 1.131$$

Norm(vec_x): Function to get the norm (Euclidean distance) of the vector vec_x

As understood from the above, (1) the difference obtained by using BNN, or the difference (the norm of the difference vector between both vectors≈1.323) between the target vector and the data (vector $vec1\_Mtx^{(2)}$) in the first row of the weight matrix W obtained using the scaling coefficient vector (six-dimensional vector) and the binary basis matrix and (2) the difference obtained by using the neural network performing vector decomposition with a multi-valued basis matrix (here, a 4-value basis matrix), or the difference (the norm of the difference vector between both vectors≈1.131) between the target vector and the data (vector $vec1\_Mtx^{(4)}$) in the first row of the weight matrix W obtained using the scaling coefficient vector (three-dimensional vector) and the N-value basis matrix (N=4)) are approximately the same.

In other words, the neural network processor 100 of the present embodiment achieves approximately the same calculation accuracy (CNN processing accuracy) as when BNN is used. In other words, the neural network processor 100 allows the accuracy of the CNN processing to be ensured even when a multi-valued (N-value) basis matrix is used as the basis matrix of the feature map, and the number of elements of the scaling coefficient vector of the feature map is reduced.

The operation of the neural network processor 100 that performs such processing will now be described with reference to the drawings.

1.2.1: Processing of Convolutional Layer)

First, the processing of the convolutional layer will be described.

The quantization processing unit 2 of the neural network processor 100 obtains a quantization width Δd between the maximum value and the minimum value in the m-th (m is a natural number) feature map $z^1_{ijm}$ in the first layer (1 is a natural number) as follows:

$$\Delta d=\{max(z^1_{ijm})-min(z^1_{ijm})\}/(2^Q-1)$$

max(x): Function to get the maximum value of x min(x): Function to get the minimum value of x Q: The number of quantization bits.

The quantization processing unit 2 then shifts values so that the minimum value of the feature map becomes 0. In other words, the quantization processing unit 2 performs processing according to:

$$z^1_{ijm}{}' = \{z^1_{ijm} - \min(z^1_{ijm})\}/Q.$$

The quantization processing unit 2 then rounds off the value obtained by the above formula for quantization. Further, the quantization processing unit 2 performs binarization processing on the value obtaining by rounding quantization to obtain a binary code $z^1_{ijm}{}^{(b)} \in \{0,1\}$.

The binary code $z^1_{ijm}{}^{(b)} \in \{0,1\}$ (feature map $B_{ij}r_{ij}$ after quantization processing) obtained as described above is stored and held in a predetermined area of the internal RAM (this area is referred to as an area BinInT).

1.2.2: Dot Product Processing (Processing of Convolution Layer)

Next, the dot product processing will be described.

The second interface unit IF2 of the dot product processing unit 3 reads out data stored in a predetermined area of the internal RAM R1 as data Info1.Mtx$^{(N)}$, and transmits the readout data Info1.Mtx$^{(N)}$ to the mode setting unit 31.

The mode setting unit 31 generates a mode signal based on the data Info1.Mtx$^{(N)}$ transmitted from the second interface unit IF2, and transmits the generated mode signal model to the integer processing unit 33.

Data Info1.Mtx$^{(N)}$ contains information on the number of bits for expressing values of individual elements of the N-value basis matrix used in the neural network processor 100. For example, when the value of each element of the N-value basis matrix used in the neural network processor 100 is four-valued data (N=4), the number of bits for expressing the value of each element of the N-value basis matrix is "2" (i.e., two bits). In this case, the mode setting unit 31 transmits the mode signal Mode indicating a 2-bit mode (the mode signal Mode indicating that the number of bits for expressing the value of each element of the N-value basis matrix is "2") to the integer calculation unit 33A of the integer processing unit 33.

In the above case, the integer calculation unit 33A performs integer calculation processing in the 2-bit mode in accordance with the mode signal Mode.

In addition to the above-mentioned 2-bit mode, the mode used in the neural network processor 100 may be, for example, a 1-bit mode (a mode using a binary basis matrix), a 4-bit mode (for example, a mode using a 15-value basis matrix or a 16-value basis matrix), or the like.

The second interface unit IF2 reads out data (information), which has been stored and held in a predetermined area of the internal RAM R1, for determining the number of loop processing to be performed by the integer processing unit 33 and the number of loop processing to be performed by the real number processing unit 34 as data Info2.Mtx$^{(N)}$, and transmits the readout data Info2.Mtx$^{(N)}$ to the loop count obtaining unit 32.

Based on the data Info2.Mtx$^{(N)}$, the loop count obtaining unit 32 generates (1) the control signal Ctrl_loop1 for controlling the number of loops in the integer integration processing performed by the integer processing unit 33, and (2) the control signal Ctrl_loop2 for controlling the number of loops in the real number integration processing performed by the real number processing unit 34. The loop count obtaining unit 32 then transmits the control signal Ctrl_loop1 to the integer processing unit 33, and transmits the control signal Ctrl_loop2 to the real number processing unit 34.

Further, the second interface unit IF2 of the dot product processing unit 3 reads out the data of the code table stored and held in a predetermined area of the internal RAM R1 as data D_tb1, and transmits the readout data D_tb1 to the code table holding unit 331.

The data D_tb1 is data for specifying the code table. For example, in the case where a four-value basis matrix is used in the neural network processor 100 and the four valued data is {−2, −1, 1, 2}, the data D_tb1 is, for example, data for specifying the correspondence between 2-bit patterns and values (four integer values (four valued data)), as shown in FIG. 8. Note that FIG. 8 shows a mere example, and thus the correspondence between bit patterns for the N-value basis matrix and codewords (integer values) may be one other than those shown in FIG. 8 (may be arbitrary).

Hereinafter, for convenience of explanation, an exemplary case where the following conditions is used in the neural network processor 100 will be described.

(1) The setting mode is a 2-bit mode.

(2) N=4, that is, when a four-value basis matrix is used, the four-valued data is {−2, −1, 1, 2}.

(3) The width of the bus between the internal RAM R1 and the second interface unit IF2 of the dot product processing unit 3 is 8 bits (i.e., the number of bits that can be transferred at one time is 8 bits).

Figure 9:
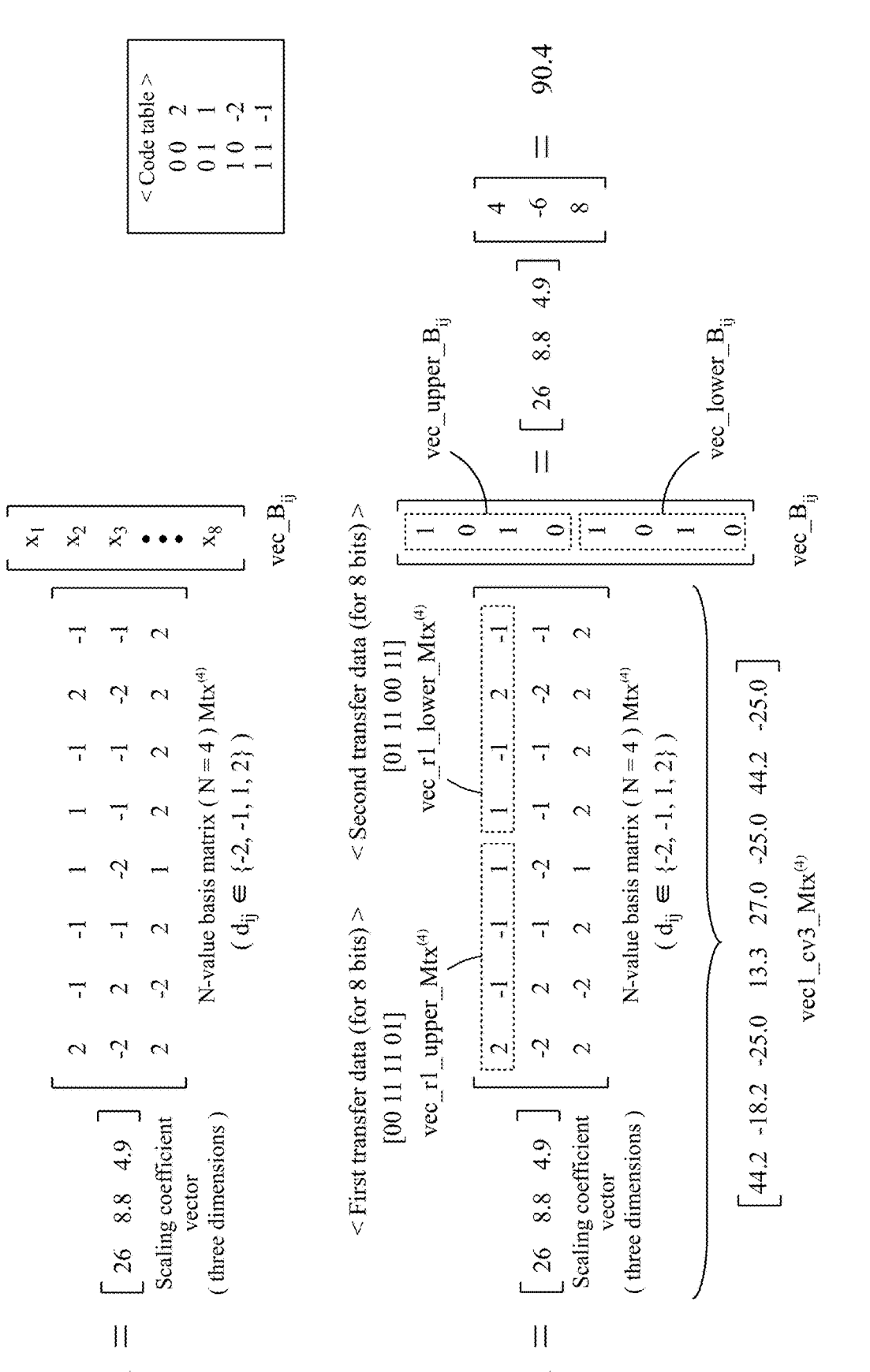
FIG. 9 is a diagram for explaining a dot product calculation processing (matrix calculation processing) of the neural network processor 100.

Further, for convenience of explanation, a case (an example) of executing the calculation shown in FIG. 9 in the neural network processor 100 will be described below. In the case of FIG. 9, the number of loops in the integer integration processing performed by the integer processing unit 33 and the number of loops in the real number integration processing performed by the real number processing unit 34 are as follows.

(1) the Number of Loops in Integer Integration Processing (Control Signal Ctrl_Loop1)

The number of columns of the N-value base matrix (N=4) is 8, and the number of rows of the data D_Qin (binary code $z^1_{ijm}{}^{(b)}$) (denoted as vec_$B_{ij}$ in FIG. 9) after quantization processing is 8; thus, when the mode is the 2-bit mode, the number of loops in the integer integration processing performed by the integer processing unit 33 is "1" (=(the number of columns of N-value base matrix (N=4))×(the number of bits required to represent one codeword)/(bus width (the number of bits that can be transferred at one time))=8×2/8)−1).

Thus, in this case, the loop count obtaining unit 32 generates a control signal Ctrl_loop1 for setting the loop count in the integer integration processing to "1", and transmits the control signal Ctrl_loop1 to the integer processing unit 33.

(2) the Number of Loops in Real Number Integration Processing (Control Signal Ctrl_Loop2)

Since the number of dimensions of the scaling coefficient vector is "3", the number of loops in the real number integration processing performed by the real number processing unit 34 is "2" (=(the number of dimensions of the scaling coefficient vector)−1).

Thus, in this case, the loop count obtaining unit 32 generates a control signal Ctrl_loop2 for setting the loop count in the real number integration processing to "2", and transmits the control signal Ctrl_loop2 to the real number processing unit 34.

<<First Integer Integration Processing>>

First, the integer processing unit 33 performs the first integer integration processing.

The code table holding unit 331 receives the data of the code table transmitted from the second interface unit IF2, and holds the data of the code table. Specifically, the code table holding unit 331 holds the data of the code table shown in FIG. 8.

Further, the second interface unit IF2 reads out the multi-value matrix data $D\_Mtx^{(N)}$ stored and held in a predetermined area of the internal RAM R1 and transmits the readout data $D\_Mtx^{(N)}$ to the decoder 332. Since N=4 is satisfied, the multi-value matrix data $D\_Mtx^{(N)}$ is the 4-value matrix data $D\_Mtx^{(4)}$. In the case of FIG. 9, in the first data transfer, 8-bit data [00 11 11 01] (four pieces of 2-bit data) is transferred from the internal RAM R1 to the second interface unit IF2. In other words, data consisting of 8 bits corresponding to the vector (1×4 matrix) $tec\_r1\_upper\_Mtx^{(4)}$ whose elements are the elements from the first column to the fourth column of the 4-value basis matrix shown in FIG. 9 is transferred from the internal RAM R1 to the second interface unit IF2.

The decoder 332 refers to the code table held by the code table holding unit 331 and performs decoding processing on the multi-value matrix data $D\_Mtx^{(N)}$ (here, the 4-value matrix data $D\_Mtx^{(4)}$) to obtain data after the decoding processing as data D1. Here, since the mode is set to the 2-bit mode and the code table is as shown in FIG. 8, the decoder 332 decodes the 2-bit patterns of the 4-value matrix data $D\_Mtx^{(4)}$ based on the code table of FIG. 8 to integer values. Based on the code table of FIG. 8, the decoder 332 decodes 8-bit data [00 11 11 01] (four pieces of 2-bit data) obtained by the first data transfer to [2 −1 −1 1] (four integer values).

The decoder 332 then transmits the decoded integer value data as data D1 to the integer multiplier 333.

Further, the second interface unit IF2 reads out the quantized data D_Qin (binary code $z^1_{ijm}{}^{(b)}$) stored and held in the area BinInT of the internal RAM R1 and transmits the readout data D_Qin to the integer multiplier 333. As shown in FIG. 9, it is assumed that the data D_Qin is a matrix of 1 row by 8 columns, and is [1 0 1 0 1 0 1 0] (expressed as a transposed matrix). Since this data D_Qin is data for 8 bits, the data can be transferred by one transfer from the internal RAM R1 to the second interface unit IF2.

The second interface unit IF2 transmits the data D1 (=[2−1 −1 1] (four integer values)) obtained by the decoder 332 and the data required for performing integer multiplication processing, that is, the data for 4 bits of the data D_Qin in this case, to the integer multiplier 333. Specifically, the second interface unit IF2 transmits data for the upper 4 bits of the data D_Qin (this is referred to as data $vec\_upper\_B_{ij}$; see FIG. 9) to the integer multiplier 333.

The integer multiplier 333 performs integer multiplication processing on data $vec\_upper\_B_{ij}$ (=[1 0 1 0] (expressed as a transposed matrix)) for the upper 4 bits of the data D_Qin (=[1 0 1 0 1 0 1 0] (expressed as a transposed matrix)) and the data D1 (=[2−1 −1 1] (4 integer values)). Specifically, the integer multiplier 333 performs processing corresponding to the following formula to obtain the integer multiplication processing result as data D2. Note that the data of the integer multiplication processing result of the k-th time (k is a natural number) is referred to as data D2(k).

First time: D2(1)=1×2=2

Second time: D2(2)=0×(−1)=0

Third time: D2(3)=1×(−1)=−1

Fourth time: D2(4)=0×1=0

The integer multiplier 333 transmits the data D2(k) obtained as described above to the integrator 336.

The integrator 334 performs integration processing on the data D2(D2 (k)) transmitted from the integer multiplier 333 to obtain the data after the integration processing as the data D3. In the above case, the integrator 334 performs processing according to the following formula to obtain the data D3 (in this case D3=1).

$$D3=D2(1)+D2(2)+D2(3)+D2(4)=1$$

The integrator 334 then transmits the obtained data D3 to the integer integration unit 33B.

<<Second Integer Integration Processing>>

Next, the integer processing unit 33 performs the second integer integration processing.

The second interface unit IF2 reads out the multi-value matrix data $D\_Mtx^{(N)}$ (N=4) stored and held in a predetermined area of the internal RAM R1, and transmits the readout data $D\_Mtx^{(N)}$ to the decoder 332. In the second data transfer, 8-bit data [01 11 00 11] (four pieces of 2-bit data) is transferred from the internal RAM R1 to the second interface unit IF2. In other words, data consisting of 8 bits corresponding to the vector (1×4 matrix) $vec\_r1\_lower\_Mtx^{(4)}$ whose elements are the elements from the fifth column to the eighth column of the first row of the 4-value basis matrix shown in FIG. 9 is transferred from the internal RAM R1 to the second interface unit IF2.

The decoder 332 refers to the code table held by the code table holding unit 331 and performs decoding processing on the multi-value matrix data $D\_Mtx^{(N)}$ (here, the 4-value matrix data $D\_Mtx^{(4)}$) to obtain data after the decoding processing as the data D1. Here, since the mode is set to the 2-bit mode and the code table is as shown in FIG. 8, the decoder 332 decodes the 2-bit patterns of the 4-value matrix data $D\_Mtx^{(4)}$ based on the code table of FIG. 8 to integer values. Based on the code table of FIG. 8, the decoder 332 decodes 8-bit data [01 11 00 11] (four pieces of 2-bit data) obtained by the second data transfer to [1 −1 2 −1] (four integer values).

The decoder 332 then transmits the decoded integer value data as the data D1 to the integer multiplier 333.

Further, the second interface unit IF2 transmits the data (this is referred to as data $vec\_lower\_B_{ij}$; see FIG. 9) for the lower 4 bits of the quantized data D_Qin (binary code $z^1_{ijm}{}^{(b)}$) read from the area BinInT of the internal RAM R1 in the first integer integration processing to the integer multiplier 333.

The integer multiplier 333 performs integer multiplication processing on data vec_lower_Bij (=[1 0 1 0] (expressed as a transposed matrix)) for the lower 4 bits of the data D_Qin (=[1 0 1 0 1 0 1 0] (expressed as a transposed matrix)) and the data D1 (=[1 −1 2 −1] (4 integer values)). Specifically, the integer multiplier 333 performs processing corresponding to the following formula to obtain the integer multiplication processing result as data D2. Note that the data of the integer multiplication processing result of the k-th time (k is a natural number) is referred to as data D2(k).

First time: D2(1)=1×1=1

Second time: D2(2)=0×(−1)=0

Third time: D2(3)=1×2=2

Fourth time: D2(4)=0×(−1)=0

The integer multiplier 333 transmits the data D2(k) obtained as described above to the integrator 336.

The integrator 334 performs integration processing on the data D2(D2 (k)) transmitted from the integer multiplier 333 to obtain the data after the integration processing as the data D3. In the above case, the integrator 334 performs processing according to the following formula to obtain the data D3 (in this case D3=3).

$$D3=D2(1)+D2(2)+D2(3)+D2(4)=3$$

The integrator 334 then transmits the obtained data D3 to the integer integration unit 33B.

The integrator 336 of the integer integration unit 33B receives the data D3 transmitted from the integer calculation unit 33A and the output data D4(t−1) of the delay device 335 (one-timestep previous integration processing result data of the integrator 336). The integrator 336 then performs integration processing on the data D3 and the data D4(t−1). In other words, the integrator 336 of the integer integration unit 33B sets the result of the first integer processing to D4(t−1), sets the result of the second integer processing to D3(t), and performs processing according to the following formula to obtain data DIo after the integration processing.

$$DIo=D4(t-1)+D3(t)=1+3=4$$

<<First Real Number Processing>>

First, the real number processing unit 34 performs the first real number processing.

The second interface unit IF2 reads out the scaling coefficient vector data D_cv from a predetermined area of the internal RAM R1. In the case of FIG. 9, the second interface unit IF2 reads out data of the first element $c_1$ of the three-dimensional scaling coefficient vector v_c ($=[c_1\ c_2\ c_3]=[26\ 8.8\ 4.9]$) a predetermined area of the internal RAM R1, transmits the readout data to the real number processing unit 34 as scaling coefficient vector data D_cv (D_cv(1)) (=26). Note that the scaling coefficient vector data D_cv read out in the k-th (k is a natural number) real number processing is referred to as D_cv(k).

The real number multiplication unit 34A of the real number processing unit 34 receives the scaling coefficient vector data D_cv(1) (=26) transmitted from the second interface unit IF2 and the data DIo (=4) transmitted from the integer processing unit 33. The real number multiplication unit 34A performs real number multiplication processing on the scaling coefficient vector data D_cv and the data DIo. In other words, the real number multiplication unit 34A performs processing according to the following formula to obtain data D5 after real number processing.

$$D5=D\_cv(1)×DIo=26×4=104$$

The real number multiplication unit 34A then transmits the data D5 to the real number integration unit 34B.

<<Second Real Number Processing>>

Next, the real number processing unit 34 performs the second real number processing.

The second interface unit IF2 reads out the scaling coefficient vector data D_cv from the predetermined area of the internal RAM R1. In the case of FIG. 9, the second interface unit IF2 reads out the data of the second element c2 of the three-dimensional scaling coefficient vector v_c ($=[c_1\ c_2\ c_3]=[26\ 8.8\ 4.9]$) from a predetermined area of the internal RAM R1, and transmits the readout data to the real number processing unit 34 as scaling coefficient vector data D_cv (D_cv(2))(=8.8).

The integer processing unit 33 performs integer multiplication processing (dot product calculation processing) on the data for the second row of the quaternary basis matrix Mtx$^{(4)}$ and the data D_Qin (binary code $z^1_{ijm}{}^{(b)}$)(vec_B$_{ij}$ shown in FIG. 9) after quantization processing in the same manner as described above. In other words, the integer processing unit

33 performs processing according to the following formula to obtain data DIo in the same manner as described above.

$$DIo=\text{vec\_}r2\text{\_upper\_}Mtx^{(4)}\cdot\text{vec\_upper\_}B_{ij}+$$
$$\text{vec\_}r2\text{\_lower\_}Mtx^{(4)}\cdot\text{vec\_lower\_}B_{ij}=-6$$

Note that the data vec_r2_upper_Mtx$^{(4)}$ is a vector (1×4 matrix) whose elements are the elements of the first column to the fourth column of the second row of the 4-value basis matrix Mtx$^{(4)}$; in a case of FIG. 9, the following formula is satisfied.

$$\text{vec\_}r2\text{\_upper\_}Mtx^{(4)}=[-2\ 2\ -1\ -2]$$

The data vec_r2_lower_Mtx$^{(4)}$ is a vector (1×4 matrix) whose elements are the elements of the fifth column to the eighth column of the second row of the 4-value basis matrix Mtx$^{(4)}$; in a case of FIG. 9, the following formula is satisfied.

$$\text{vec\_}r2\text{\_lower\_}Mtx^{(4)}=[-1\ -1\ -2\ -1]$$

The data DIo (=−6) obtained by the above processing is transmitted from the integer processing unit 33 to the real number processing unit 34.

The real number multiplication unit 34A of the real number processing unit 34 receives the scaling coefficient vector data D_cv(2) (=8.8) transmitted from the second interface unit IF2 and the data DIo (=−6) transmitted from the integer processing unit 33. The real number multiplication unit 34A performs real number multiplication processing on the scaling coefficient vector data D_cv and the data DIo. In other words, the real number multiplication unit 34A performs processing according to the following formula to obtain data D5 after the real number multiplication processing.

$$D5=D\_cv(2)×DIo=8.8×(-6)=-52.8$$

The real number multiplication unit 34A then transmits the data D5 to the real number integration unit 34B.

The real number integrator 342 of the real number integration unit 34B receives the data D5 transmitted from the real number multiplication unit 34A and data Do(t−1) transmitted from the delay device 341 (one-timestep previous processing result data of the real number integrator). The real number integrator 342 then performs integration processing on the data D5 and the data Do(t−1). In other words, the real number integrator 342 of the real number integration unit 34B sets the processing result of the first real number processing to Do(t−1), sets the processing result of the second real number processing to Do(t), and performs processing according to the following formula to obtain data Do (=Do(t)) after the real number integration processing.

$$Do(t)=Do(t-1)+D5(t)=104+(-52.8)=51.2$$

<<Third Real Number Processing>>

Next, the real number processing unit 34 performs the third real number processing.

The second interface unit IF2 reads out the scaling coefficient vector data D_cv from a predetermined area of the internal RAM R1. In the case of FIG. 9, the second interface unit IF2 reads out data of the third element c3 of the three-dimensional scaling coefficient vector v_c ($=[c_1\ c_2\ c_3]=[26\ 8.8\ 4.9]$) from a predetermined area of the internal RAM R1, and then transmits the readout data to the real number processing unit 34 as scaling coefficient vector data D_cv (D_cv(3)) (=4.9).

The integer processing unit 33 performs integer multiplication processing (dot product calculation processing) on data of the second row of the 4-value basis matrix Mtx$^{(4)}$ and the data D_Qin (binary code $z^1_{ijm}{}^{(b)}$) (vec_B$_{ij}$ shown in FIG. 9) after quantization processing in the same manner as the above-described processing. In other words, the integer processing unit 33 performs processing according to the following formula in the same manner as the above-described processing to obtain data DIo.

$$DIo=\text{vec\_}r3\_\text{upper\_}Mtx^{(4)}\cdot\text{vec\_upper\_}B_{ij}+$$
$$\text{vec\_}r3\_\text{lower\_}Mtx^{(4)}\cdot\text{vec\_lower\_}B_{ij}=8$$

Note that the data vec_r3_upper_Mtx$^{(4)}$ is a vector ($1\times4$ matrix) whose elements are the elements of the first column to the fourth column of the third row of the 4-value basis matrix Mtx$^{(4)}$; in the case of FIG. 9, the data vec_r3_upper_Mtx$^{(4)}$ is as follows:

$$\text{vec\_}r3\_\text{upper\_}Mtx^{(4)}=[2\ -2\ 2\ 1].$$

The data vec_r3_lower_Mtx$^{(4)}$ is a vector ($1\times4$ matrix) whose elements are the elements of the fifth column to the eighth column of the third row of the 4-value basis matrix Mtx$^{(4)}$; in the case of FIG. 9, in the case of, the data vec_r3_lower_Mtx$^{(4)}$ is as follows:

$$\text{vec\_}r3\_\text{lower\_}Mtx^{(4)}=[2\ 2\ 2\ 2]$$

The data DIo ($=8$) obtained by the above processing is transmitted from the integer processing unit 33 to the real number processing unit 34.

The real number multiplication unit 34A of the real number processing unit 34 receives the scaling coefficient vector data D_cv(3) ($=4.9$) transmitted from the second interface unit IF2 and the data DIo ($=8$) transmitted from the integer processing unit 33. The real number multiplication unit 34A performs real number multiplication processing on the scaling coefficient vector data D_cv and the data DIo. In other words, the real number multiplication unit 34A performs processing according to the following formula to obtain data D5 after the real number multiplication processing.

$$D5=D\_\text{cv}(3)\times DIo=4.9\times8=39.2$$

The real number multiplication unit 34A transmits the data D5 to the real number integration unit 34B.

The real number integrator 342 of the real number integration unit 34B receives the data D5 transmitted from the real number multiplication unit 34A and the data Do(t−1) transmitted from the delay device 341 (one-timestep previous processing result data of the real number integrator). The real number integrator 342 then performs integration processing on the data D5 and the data Do(t−1). In other words, the real number integrator 342 of the real number integration unit 34B sets the processing result of the first real number processing to Do(t−1), sets the processing result of the second real number processing to Do(t), and performs processing according to the following formula to obtain data Do ($=$Do(t)) after the real number integration processing.

$$Do(t)=Do(t-1)+DS(t)=51.2+39.2=90.4$$

The obtained data Do ($=$Do (t)) is transmitted from the real number processing unit 34 to the second interface unit IF2. The second interface unit IF2 then writes, for example, the data Do to a predetermined area of the internal RAM R1.

Performing processing as described above in the neural network processor 100 allows for executing the matrix calculation in the lower part of FIG. 9, thereby obtaining the value of $y_1$. In other words, processing as described above in the neural network processor 100 achieves the processing accuracy equivalent to the processing accuracy in BNN, and furthermore significantly reduces the real number calculation processing amount as compared with BNN. In a case of executing the calculations shown in FIGS. 4 and 5, (1) when executed by BNN, the dimension of the scaling coefficient vector whose elements are real numbers is "6", and the number of operations of real numbers is correspondingly increased; however, (2) when executed by the neural network processor 100 using the N-value basis matrix (N=4), the dimension of the scaling coefficient vector is "3" (half of that of BNN), and accordingly the number of real number calculation processes is significantly smaller than in the case of BNN.

As described above, the neural network processor 100 allows the processing amount of the real number operation to be significantly reduced while ensuring the calculation accuracy equivalent to that of BNN.

Further, the neural network processor 100, which uses a multi-valued basis matrix (allocates a plurality of bits to one codeword (value of an element of the multi-valued basis matrix)), allows for enhancing the data transmission efficiency between the internal RAM R1 and the dot product processing unit 3. This will be described with reference to FIGS. 10 and 11.

Figure 10:
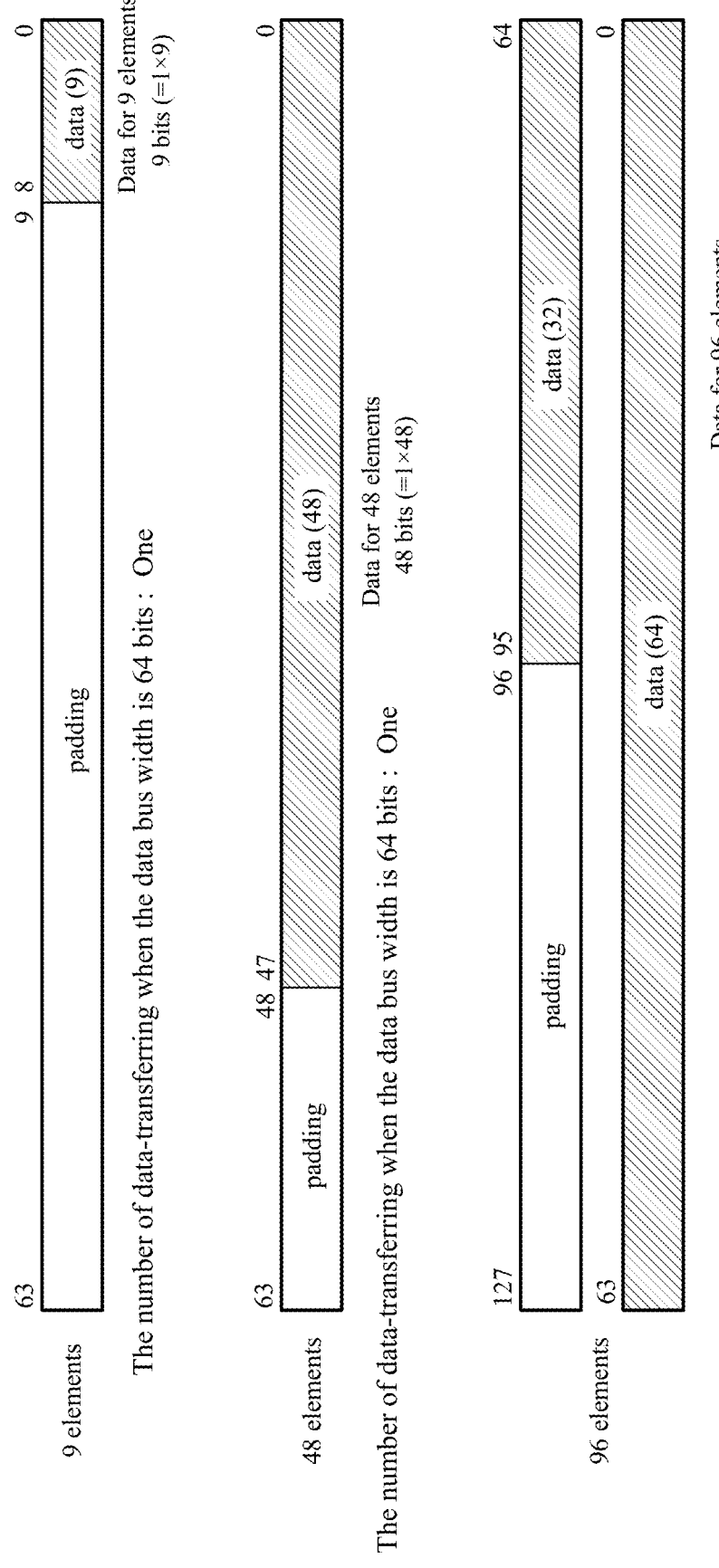
FIG. 10 is a diagram schematically showing a 1-bit data format (when one bit is assigned to one codeword).

FIG. 10 is a diagram schematically showing a 1-bit data format (when one bit is assigned to one codeword).

Figure 11:
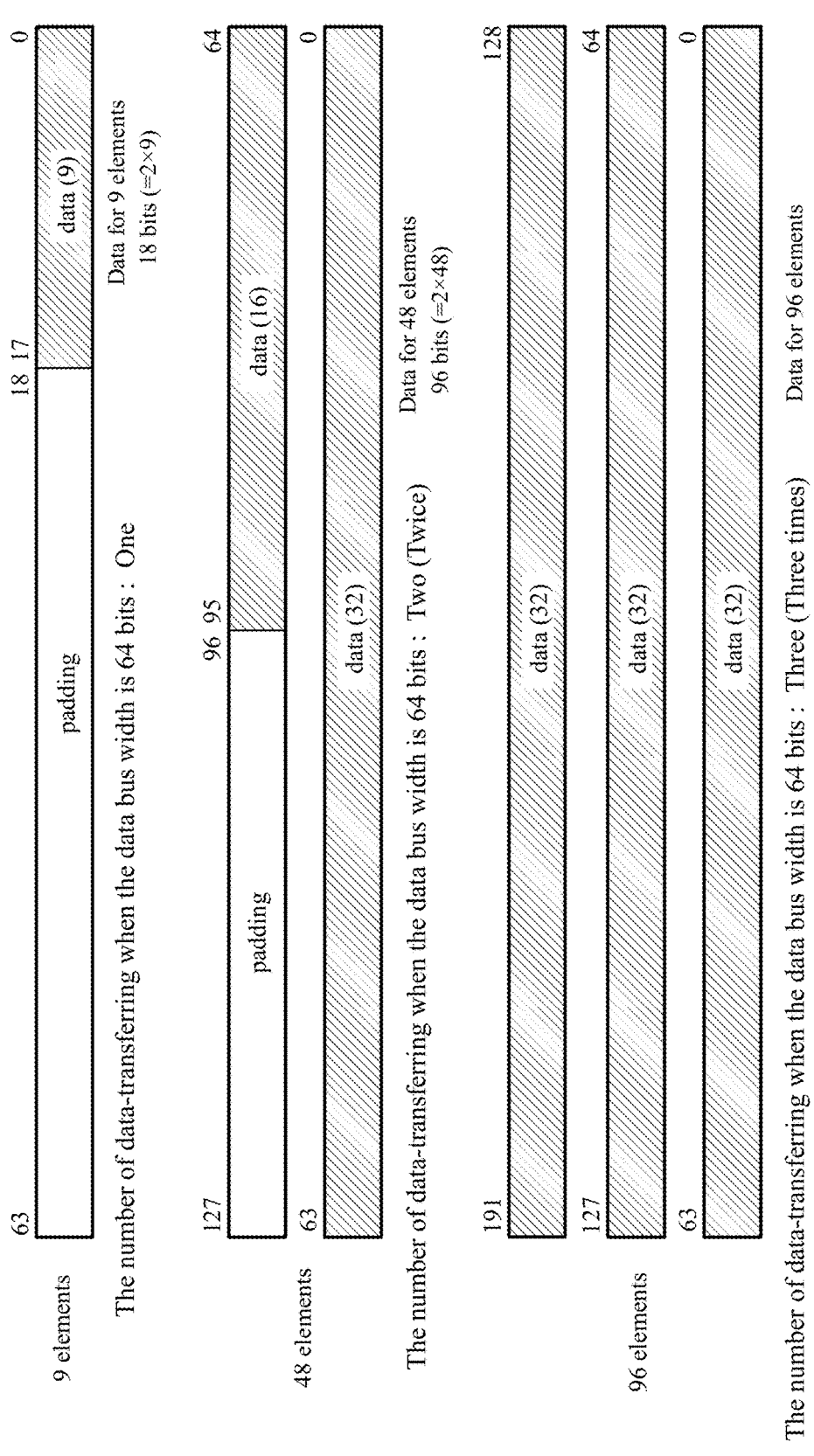
FIG. 11 is a diagram schematically showing a 2-bit data format (when two bits are assigned to one codeword).

FIG. 11 is a diagram schematically showing a 2-bit data format (when two bits are assigned to one codeword).

In the above, for convenience of explanation, the bus width of the data transfer bus between the internal RAM R1 and the dot product processing unit 3 is eight bits; for example, a case where the bus width of the data transfer bus between the internal RAM R1 and the dot product processing unit 3 is 64 bits will now be described.

When transferring data for nine elements in the 1-bit mode (when one bit is assigned to one codeword, BNN corresponds to this), as shown in the upper part of FIG. 10, the data is for nine bits and the remaining 55 bits of the data becomes padding data; thus, the ratio of valid data in the data transfer bus is low, and the data transfer efficiency is poor.

When transferring data for nine elements in the 2-bit mode (when two bits are assigned to one codeword, the case where the neural network processor 100 of the above embodiment processes using a 4-value base matrix corresponds to this), as shown in the upper part of FIG. 11, the data is 18 bits ($=2\times9$), the remaining 46 bits are padding data; thus, the ratio of valid data in the data transfer bus is high as compared with the 1-bit mode (in the case of FIG. 10), and the data transfer efficiency is good.

When transferring data for 9 elements, as can be seen from the upper diagram of FIG. 10 and the upper diagram of FIG. 11, the number of data transfers is one and is the same for both. Thus, in this case, the neural network processor 100 performs data-transferring between the internal RAM R1 and the dot product processing unit 3 in the 2-bit mode (in the case of FIG. 11), thereby allowing the required number of data transfers to be the same as in the case of performing data-transfer in the 1-bit mode (a case processed by BNN). In this case (the case when the neural network processor 100 performs processing in the 2-bit mode), as described above, it is possible to significantly reduce the number of dimensions of the scaling coefficient vector as compared with the case of performing processing in the 1-bit mode (a case processed by BNN) (in the above embodiment, the number of dimensions of the scaling coefficient vector is reduced from six dimensions to three dimensions). Thus, in this case, the number of data-transferring between the internal RAM R1 and the dot product processing unit 3 in the neural network processor 100 is the same as in the case of processing in the 1-bit mode (a case processed by BNN), and furthermore the real number calculation processing amount is significantly reduced.

As shown in the middle part of FIG. 10 and the middle part of FIG. 11, when data for 48 elements is transferred, the number of data-transferring in the 2-bit mode in the neural network processor 100 is twice as much as that in the case of processing in the 1-bit mode (a case processed by BNN)(the number of data-transferring is two); however, as shown in the lower part of FIG. 10 and the lower part of FIG. 11, when data for 96 elements is transferred, the number of data-transferring in the 2-bit mode in the neural network processor 100 is only 1.5 times that in the case of processing in the 1-bit mode (a case processed by BNN) (the number of data-transferring in the case of the 1-bit mode is two, and the number of data-transferring is three).

In other words, when the neural network processor 100 performs processing in the N-bit mode, the number of data-transferring increases at a rate lower than the rate of increase in the number of codewords, as compared with the case of processing in the 1-bit mode (For example, even if the number of codewords is doubled, the number of data-transferring is doubled or less). On the other hand, when the neural network processor 100 performs processing in the N-bit mode, the number of dimensions of the scaling coefficient vector is significantly reduced as compared with the case of processing in the 1-bit mode; as a result, the real number calculation amount is significantly reduced. Thus, when the neural network processor 100 performs processing in the N-bit mode, the total processing amount is significantly reduced as compared with the case where the processing is performed in the 1-bit mode.

Performing processing using the multi-valued basis matrix in the neural network processor 100 as described above increases the utilization rate of the data transfer bus for data-transferring between the internal RAM R1 and the dot product processing unit 3 and reduces the dimension of the scaling coefficient vector, thereby allowing the amount of real number calculation processing to be significantly reduced. Thus, the neural network processor 100 significantly reduces the amount of calculation processing while ensuring the same calculation accuracy as in the case of processing with the conventional BNN.

In the above, for convenience of explanation, the case where the data D_Qin after quantization processing is the data of the matrix of one row and eight columns and each element is the 1-bit data has been described, but the present invention should not be limited to this; the data D_Qin after quantization processing may be data of an arbitrary n rows by m columns (n and m are natural numbers) matrix, and each element may be p-bit (p is a natural number) data.

Figure 12:
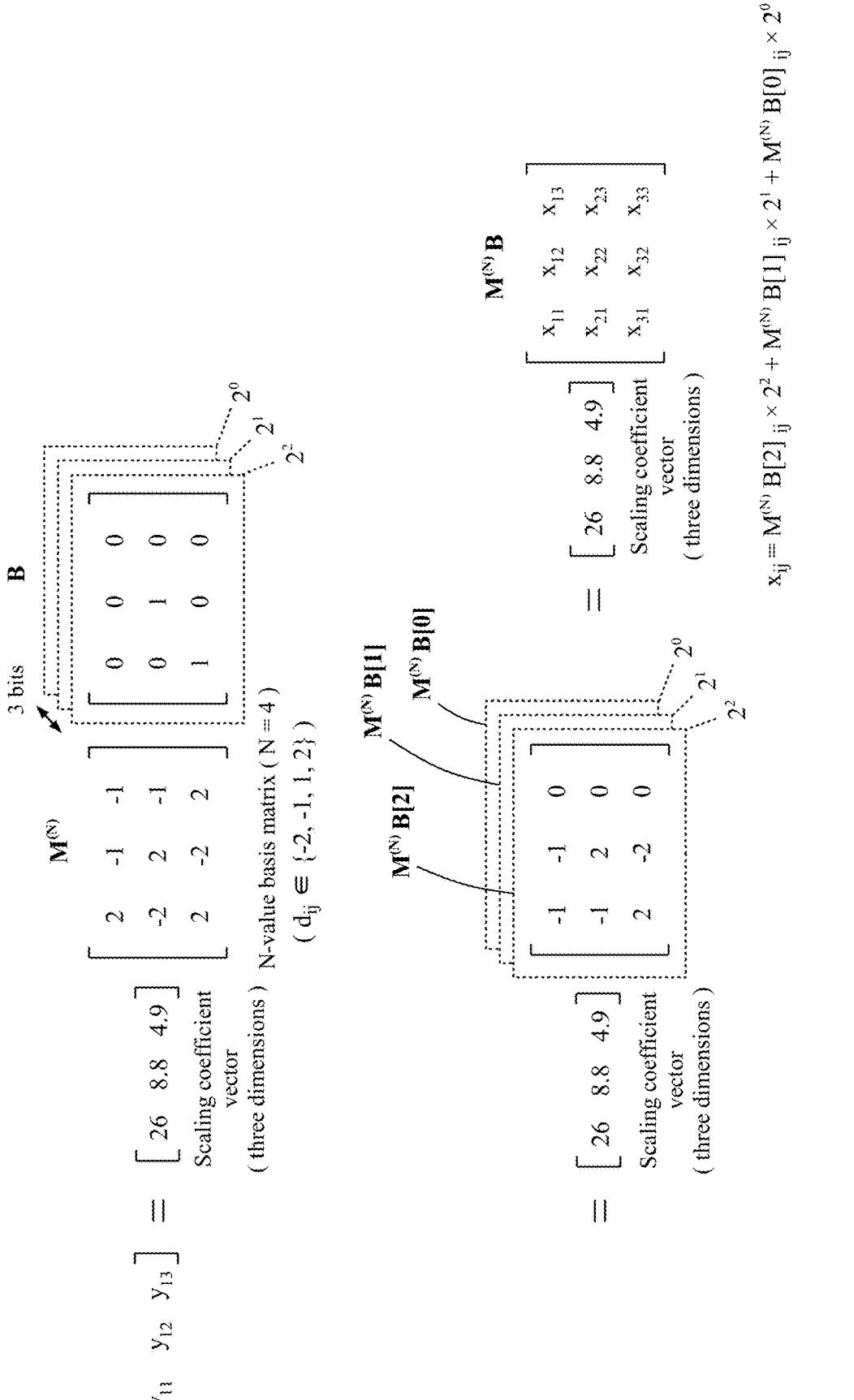
FIG. 12 is a diagram for explaining dot product calculation processing (matrix calculation processing) of the neural network processor 100.

For example, as shown in FIG. 12, when calculating output data $[y_{11} \ y_{12} \ y_{13}]$ of 1 row and 3 columns, the neural network processor 100 performs matrix calculation processing, in the same manner as described above, on a three-dimensional scaling coefficient vector, an N value base matrix of 3 rows and 3 columns (N=4) and p-bit data after quantization processing (in the case of FIG. 12 where p=3 is satisfied, a 3×3 matrix of the binarized data after quantization for the third bit (this is expressed as B[2]), a 3×3 matrix of the binarized data after quantization for the second bit (this is expressed as B[1]), and a 3×3 matrix of the binarized data after quantization for the first bit (this is expressed as B[0])). This allows the neural network processor 100 to obtain the calculation result shown in the lower right part of FIG. 12. Note that the element $x_{ij}$ of the 3×3 matrix $M^{(N)}B$ to be multiplied by the scaling coefficient vector of the calculation result is as follows:

$$x_{ij} = M^{(N)}B[2]_{ij} \times 2^2 + M^{(N)}B[1]_{ij} \times 2^1 + M^{(N)}B[0]_{ij} \times 2^0$$

Note that $M^{(N)}B[k]_{ij}$ (k is an integer satisfying $0 \leq k \leq 2$) denotes an element of the i-th row and j-th column (i, j are natural numbers satisfying $1 \leq i \leq 3$ and $1 \leq j \leq 3$) of the 3×3 matrix shown in FIG. 12.

Further, the N-value basis matrix used in the neural network processor 100 may use any N-value. In the above, the case where N=4 is satisfied, that is, the four-valued basis matrix is used in the neural network processor 100 using the code table of FIG. 8 has been described, but the present invention should not be limited thereto. For example, as shown in the left figure of FIG. 13, the neural network processor 100 may perform dot product calculation processing (matrix calculation processing), in the same manner as described above, using a code table for a 3-value basis matrix (i.e., using a 3-value basis matrix (N=3)). Alternatively, as shown in the right figure of FIG. 13, the neural network processor 100 may perform dot product calculation processing (matrix calculation processing), in the same manner as described above, using a code table for an 8-value basis matrix (i.e., using a 8-value basis matrix (N=8)). Alternatively, the neural network processor 100 may perform dot product calculation processing (matrix calculation processing), in the same manner as described above, using a code table for a 15-value basis matrix (i.e., using a 15-value basis matrix). Alternatively, the neural network processor 100 may perform dot product calculation processing (matrix calculation processing), in the same manner as described above, using a code table for a 16-value basis matrix (i.e., using a 16-value basis matrix).

In the neural network processor 100, the codeword usage ratio in the code table is preferably 75% or more. In the left figure of FIG. 13, since the bit pattern "00" has no codeword assigned, and only three are used for the codeword out of the four 2-bit bit patterns, the word usage ratio is 75%. In the right figure of FIG. 13, since the codeword is assigned to all the bit patterns, the codeword usage rate of the code table in the right figure of FIG. 13 is 100%.

Further, it is preferable to include at least one codeword (integer value) that is not a power of two in the codeword (integer value) that can be taken by the elements of the N-value base matrix (for example, in the codeword in the right figure of FIG. 13, the codeword (integer value) "3" assigned to the bit pattern "001" and the codeword (integer value) "−3" assigned to the bit pattern "110" correspond to this). This increases the variation of the integer value that can be expressed, thus improving the accuracy of the calculation in the neural network processor 100.

Further, when the neural network processor 100 performs the dot product calculation processing (matrix calculation processing) by using the 4-value basis matrix with the 4-value code table, it is preferable to perform the dot product calculation processing (matrix calculation processing) by using a code table that does not include "0" as shown in FIG. 8, for example. As a result, since a specific bit pattern is not assigned to the codeword "0", the bit pattern can be assigned to another codeword (integer value), thus increasing the variation of the numerical values that can be expressed. In particular, when a dense matrix calculation is often performed, performing dot product calculation processing (matrix calculation processing) using a code table that assigns a bit pattern to an integer value (codeword) other than "0" as described above allows the processing to be performed efficiently and with high accuracy.

As described above, the neural network processor 100 significantly reduces the amount of calculation processing while ensuring the same calculation accuracy as in the case of processing by the conventional BNN. Further, the neural network processor 100, as described above, increases the occupancy ratio of the effective data in the bus width of the data transfer bus, thus allowing the calculation processing to be performed efficiently. Further, the neural network processor 100 flexibly sets the integer values (codewords) taken by each element of the multi-value (N-value) basis matrix by using the code table, thus allowing various matrix calculation processing to be performed efficiently.

As described above, the neural network processor 100 efficiently performs high-accuracy calculation processing while having flexibility. Thus, using the neural network processor 100 allows the high-performance compact model for the neural network to be incorporated into low-spec devices (for example, edge terminals) such embedded devices or mobile devices without requiring re-training.

Other Embodiments

In the above embodiment, the processing performed by the neural network processor 100 has been described assuming the processing of the convolution layer, but the present invention should not be limited to this; the neural network processor 100 may perform processing for a fully connected layer in the same manner. In this case, the neural network processor 100 may perform processing in the same manner by using the above-mentioned feature map (matrix data) as a feature vector (vector data).

A part or all of each functional part of the neural network processor 100 may be provided by microcode(s) or by predetermined hardware together with microcode(s).

Further, in the above embodiment, the case where the output data Do of the real number processing unit 34 is transmitted to the second interface and the data Do is written to the internal RAM R1 by the second interface in the neural network processor 100 has been described; however, the present invention should not be limited to this. For example, the neural network processor 100 may write data obtained by adjusting an offset of the second term on the right side of Formula 3 for the output data Do of the real number processing unit 34 to the internal RAM R1.

Further, in the above embodiment, the case where the dot product processing unit performs a part of the calculation processing of the neural network has been described, but the present invention should not be limited to this; for example, the processing of the activation function (for example, the processing of the ReLU function) may be performed in the dot product processing unit 3 of the calculation processing unit PL1. Further, the processing of the activation function (for example, the processing of the ReLU function) may be performed by the dot product processing unit 3 and the control unit CPU 1.

In the above embodiment, the number of internal RAMs has been described without particular limitation, but the internal RAM may be composed of a plurality of RAMs; further, the processing of the above embodiment may be performed by using a RAM (for example, DRAM) provided outside the neural network processor 100 or the like.

In the above embodiment, the data represented by scalars, vectors, and matrices is an example, and should not be limited to the above. Depending on the BNN processing, the neural network processor 100 may use data of scalars, vectors, and/or tensors accordingly to perform processing in the same manner as described above.

Some or all of the functional units of each device included in the neural network processor 100 described in the above embodiment may be individually integrated into one chip with a semiconductor device such as an LSI, or may be integrated into one chip for some or all of the functional units to be included in the chip. Further, each block (each functional unit) of the neural network processor 100 described in the above embodiment may be achieved by a semiconductor device such as a plurality of LSIs.

Note that although the term LSI is used here, it may also be called IC, system LSI, super LSI, or ultra LSI depending on the degree of integration.

Further, the method of circuit integration should not be limited to LSI, and it may be implemented with a dedicated circuit or a general-purpose processor. A field programmable gate array (FPGA) that can be programmed after the LSI is manufactured, or a reconfigurable processor that can reconfigure connection and setting of circuit cells inside the LSI may be used.

Further, a part or all of the processing of each functional block of each of the above embodiment may be implemented with a program. A part or all of the processing of each functional block of each of the above-described embodiment is then performed by a central processing unit (CPU) in a computer. The programs for these processes may be stored in a storage device, such as a hard disk or a ROM, and may be executed from the ROM or be read into a RAM and then executed.

The processes described in the above embodiment may be implemented by using either hardware or software (including use of an operating system (OS), middleware, or a predetermined library), or may be implemented using both software and hardware.

Figure 14:
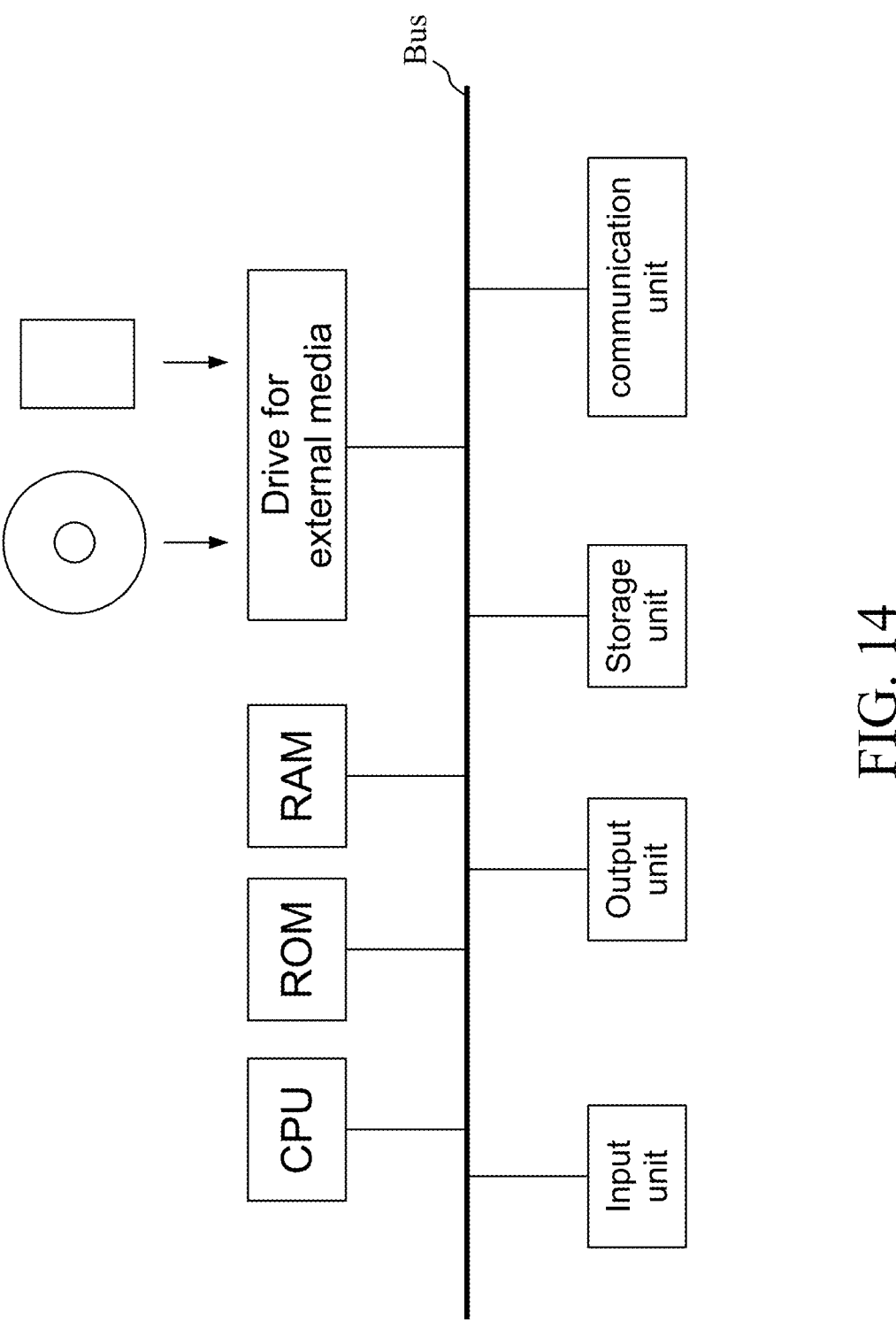
FIG. 14 is a diagram showing a CPU bus configuration.

For example, when functional units of the above embodiment and modifications is achieved by using software, the hardware structure (the hardware structure including CPU, GPU, ROM, RAM, an input unit, an output unit or the like, each of which is connected to a bus) shown in FIG. 14 may be employed to achieve the functional units by using software.

The processes described in the above embodiment may not be performed in the order specified in the above embodiment. The order in which the processes are performed may be changed without departing from the scope and the spirit of the invention.

The present invention may also include a computer program enabling a computer to implement the method described in the above embodiments and a computer readable recording medium on which such a program is recorded. Examples of the computer readable recording medium include a flexible disk, a hard disk, a CD-ROM, an MO, a DVD, a DVD-ROM, a DVD-RAM, a large capacity DVD, a next-generation DVD, and a semiconductor memory.

The computer program may not be recorded on the recording medium but may be transmitted with an electric communication line, a radio or cable communication line, or a network such as the Internet.

The term "unit" may include "circuitry," which may be partly or entirely implemented by using either hardware or software, or both hardware and software.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are —programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The specific structures described in the above embodiments are mere examples of the present invention, and may be changed and modified variously without departing from the scope and the spirit of the invention.

REFERENCE SIGNS LIST 100 neural network processor (processor for a neural network)
PL1 calculation processing unit
1 DMA control unit
2 quantization processing unit
R1 internal RAM
3 dot product processing unit
31 mode setting section
32 loop count obtaining unit
33 integer processing unit
34 real number integration unit

What is claimed is:

1. A processor for a neural network for performing multi-valued neural network processing including convolution layer processing and fully connected layer processing, comprising:

a memory that is capable of storing data;
a control circuitry integrated into at least one control chip that sets a scaling coefficient vector, which is real number vector data, and a multi-valued basis matrix whose elements are multi-valued data, the control circuitry being capable of performing data-reading processing and/or data-writing processing on the memory;
a quantization processing circuitry integrated into at least one quantization processing chip that performs quantization processing on a feature map inputted into the convolution layer and a feature vector inputted into the fully connected layer, sets an offset value such that a minimum value of the feature map and a minimum value of the feature vector is smaller than a predetermined value, performs the quantization processing using a quantization width obtained based on the maximum value and the minimum value of the feature map and the maximum value and the minimum value of the feature vector, and performs data-writing processing of writing the data obtained by the quantization processing in the memory; and
a dot product processing circuitry integrated into at least one dot product processing chip that performs matrix calculation processing using a scaling coefficient vector having the number of elements smaller than the number of elements of the scaling coefficient vector required to achieve a predetermined approximation accuracy when using a binary basis matrix, and a multi-valued basis matrix that is set corresponding to the scaling coefficient vector, the dot product processing circuitry being capable of performing data-reading processing and/or data-writing processing on the memory, wherein the dot product processing circuitry comprises:

an interface circuitry integrated into at least one interface chip that inputs data of elements of the multi-valued basis matrix, and is connected to a bus having an N1 bit width where N1 is a natural number and performs data transmitting and receiving processing with the memory via the bus;

a mode setting circuitry integrated into at least one mode setting chip that sets a mode to be set according to the number of possible values of the elements of the multi-valued basis matrix;

an integer calculation processing circuitry integrated into at least one integer calculation processing chip that performs integer calculation processing on data after quantization processing and data consisting of a predetermined number of elements included in the multi-valued basis matrix, based on the mode set by the mode setting circuitry; and a real number processing circuitry integrated into at least one real number processing chip that performs real number calculation processing on data obtained by performing the integer calculation processing and the scaling coefficient vector, and wherein the integer calculation processing circuitry comprises:

a code table holding circuitry integrated into at least one code table holding chip that holds a code table in which bit patterns corresponding to possible integer values of elements included in the multi-valued basis matrix are assigned to codewords that are the possible integer values; and a decoder that decodes into a codeword that is an integer value corresponding to one of the possible integer values of the elements included in the multi-valued basis matrix based on the code table held by the code table holding circuitry, wherein the integer calculation processing circuitry performs the integer calculation processing using the integer values corresponding to the data of the elements included in the multi-valued basis matrix decoded by the decoder and the data after quantization processing.

2. The processor for the neural network according to claim 1, wherein the interface circuitry is capable of inputting data for setting a code table, and outputs the data for setting the code table to the code table holding circuitry, and the code table holding circuitry holds a code table specified by the code table setting data inputted from the interface circuitry.

3. The processor for the neural network according to claim 1, wherein the dot product processing circuitry further comprises:

a loop count obtaining circuitry integrated into at least one loop count obtaining chip that determines the number of integer integration loops, which is the number of repetitions of integer integration processing of the integer calculation processing, based on the number of bits of the bus width of the interface circuitry and the total number of bits of the data of the elements of the multi-valued base matrix inputted into the interface circuitry at one time, wherein the integer calculation processing circuitry repeatedly performs the integer integration processing of the integer calculation processing in accordance with the integer integration loop number determined by the loop count obtaining circuitry.

4. The processor for the neural network according to claim 3, wherein the loop count obtaining circuitry determines the number of the real number integration loops, which is the number of repetitions of the real number calculation processing, based on the number of dimensions of the scaling coefficient vector inputted into the interface circuitry, and the real number processing circuitry repeatedly performs the real number integration processing of the real number calculation processing in accordance with the number of real number integration loops determined by the loop count obtaining circuitry.

5. A processing method for a neural network for performing multi-valued neural network processing including convolution layer processing and fully connected layer processing, the method performed with a processor and a memory that can be accessed by the processor and is capable of storing data, the processing method comprising:

a control step that, using the processor including at least one control chip, sets a scaling coefficient vector, which is real number vector data, and a multi-valued basis matrix whose elements are multi-valued data;

a quantization processing step that, using the processor including at least one quantization processing chip, performs quantization processing on a feature map inputted into the convolution layer and a feature vector inputted into the fully connected layer, sets an offset value such that a minimum value of the feature map and a minimum value of the feature vector is smaller than a predetermined value, and performs the quantization processing using a quantization width obtained based on the maximum value and the minimum value of the feature map and the maximum value and the minimum value of the feature vector; and a dot product processing step that, using the processor including at least one dot product processing chip, performs matrix calculation processing using a scaling coefficient vector having the number of elements smaller than the number of elements of the scaling coefficient vector required to achieve a predetermined approximation accuracy when using a binary basis matrix, and a multi-valued basis matrix that is set corresponding to the scaling coefficient vector, wherein the dot product processing step comprises:

an interface processing step that, using the processor including at least one interface processing chip, inputs data of elements of the multi-valued basis matrix, and is connected to a bus having an N1 bit width where N1 is a natural number and performs data transmitting and receiving processing with the memory via the bus;

a mode setting step that, using the processor including at least one mode setting chip, sets a mode to be set according to the number of possible values of the elements of the multi-valued basis matrix;

an integer calculation processing step that, using the processor including at least one integer calculation processing chip, performs integer calculation processing on data after quantization processing and data consisting of a predetermined number of elements included in the multi-valued basis matrix, based on the mode set by the mode setting step; and a real number processing step that, using the processor including at least one real number processing chip, performs real number calculation processing on data obtained by performing the integer calculation processing and the scaling coefficient vector, and wherein the integer calculation processing step comprises:

a code table holding step that, using the processor including at least one code table holding chip, holds a code table in which bit patterns corresponding to possible integer values of elements included in the multi-valued basis matrix are assigned to codewords that are the possible integer values; and a decoding step that decodes into a codeword that is an integer value corresponding to one of the possible integer values of the elements included in the multi-valued basis matrix based on the code table held by the code table holding step, wherein the integer calculation processing step performs the integer calculation processing using the integer values corresponding to the data of the elements included in the multi-valued basis matrix decoded by the decoder and the data after quantization processing.

6. A non-transitory computer readable storage medium storing a program for causing a computer to execute the processing method for a neural network according to claim 5.

7. The processor for the neural network according to claim 1, wherein the code table of the code table holding circuitry includes at least one codeword, which is an integer value, that is not a power of two.

8. The processor for the neural network according to claim 1, wherein all codewords included in the code table of the code table holding circuitry are not "0".

9. The processor for the neural network according to claim 1, wherein the at least one control chip, the at least one quantization processing chip, the at least one dot product processing chip, the at least one interface chip, the at least one mode setting chip, the at least one integer calculation processing chip, the at least one real number processing chip, and the at least one code table holding chip are integrated together into one or more chips.

10. The processor for the neural network according to claim 3, wherein the at least one control chip, the at least one quantization processing chip, the at least one dot product processing chip, the at least one interface chip, the at least one mode setting chip, the at least one integer calculation processing chip, the at least one real number processing chip, the at least one code table holding chip, and the at least one loop count obtaining chip are integrated together into one or more chips.

11. The processor for the neural network according to claim 1, wherein the processor is included in an embedded device or a mobile device.

12. A system comprising:

a processor for a neural network for performing multi-valued neural network processing including convolution layer processing and fully connected layer processing, the processor for the neural network comprising:

a memory that is capable of storing data;

a control circuitry integrated into at least one control chip that sets a scaling coefficient vector, which is real number vector data, and a multi-valued basis matrix whose elements are multi-valued data, the control circuitry being capable of performing data-reading processing and/or data-writing processing on the memory;

a quantization processing circuitry integrated into at least one quantization processing chip that performs quantization processing on a feature map inputted into the convolution layer and a feature vector inputted into the fully connected layer, sets an offset value such that a minimum value of the feature map and a minimum value of the feature vector is smaller than a predetermined value, performs the quantization processing using a quantization width obtained based on the maximum value and the minimum value of the feature map and the maximum value and the minimum value of the feature vector, and performs data-writing processing of writing the data obtained by the quantization processing in the memory; and a dot product processing circuitry integrated into at least one dot product processing chip that performs matrix calculation processing using a scaling coefficient vector having the number of elements smaller than the number of elements of the scaling coefficient vector required to achieve a predetermined approximation accuracy when using a binary basis matrix, and a multi-valued basis matrix that is set corresponding to the scaling coefficient vector, the dot product processing circuitry being capable of performing data-reading processing and/or data-writing processing on the memory, wherein the dot product processing circuitry comprises:

an interface circuitry integrated into at least one interface chip that inputs data of elements of the multi-valued basis matrix, and is connected to a bus having an N1 bit width where N1 is a natural number and performs data transmitting and receiving processing with the memory via the bus;

a mode setting circuitry integrated into at least one mode setting chip that sets a mode to be set according to the number of possible values of the elements of the multi-valued basis matrix;

an integer calculation processing circuitry integrated into at least one integer calculation processing chip that performs integer calculation processing on data after quantization processing and data consisting of a predetermined number of elements included in the multi-valued basis matrix, based on the mode set by the mode setting circuitry; and a real number processing circuitry integrated into at least one real number processing chip that performs real number calculation processing on data obtained by performing the integer calculation processing and the scaling coefficient vector, and wherein the integer calculation processing circuitry comprises:

a code table holding circuitry integrated into at least one code table holding chip that holds a code table in which bit patterns corresponding to possible integer values of elements included in the multi-valued basis matrix are assigned to codewords that are the possible integer values; and a decoder that decodes into a codeword that is an integer value corresponding to one of the possible integer values of the elements included in the multi-valued basis matrix based on the code table held by the code table holding circuitry, wherein the integer calculation processing circuitry performs the integer calculation processing using the integer values corresponding to the data of the elements included in the multi-valued basis matrix decoded by the decoder and the data after quantization processing.

13. The system according to claim 12, wherein the interface circuitry is capable of inputting data for setting a code table, and outputs the data for setting the code table to the code table holding circuitry, and the code table holding circuitry holds a code table specified by the code table setting data inputted from the interface circuitry.

14. The system according to claim 12, wherein the dot product processing circuitry further comprises:

a loop count obtaining circuitry integrated into at least one loop count obtaining chip that determines the number of integer integration loops, which is the number of repetitions of integer integration processing of the integer calculation processing, based on the number of bits of the bus width of the interface circuitry and the total number of bits of the data of the elements of the multi-valued base matrix inputted into the interface circuitry at one time, wherein the integer calculation processing circuitry repeatedly performs the integer integration processing of the integer calculation processing in accordance with the integer integration loop number determined by the loop count obtaining circuitry.

15. The system according to claim 14, wherein the loop count obtaining circuitry determines the number of the real number integration loops, which is the number of repetitions of the real number calculation processing, based on the number of dimensions of the scaling coefficient vector inputted into the interface circuitry, and the real number processing circuitry repeatedly performs the real number integration processing of the real number calculation processing in accordance with the number of real number integration loops determined by the loop count obtaining circuitry.

16. The system according to claim 12, wherein the code table of the code table holding circuitry includes at least one codeword, which is an integer value, that is not a power of two.

17. The system according to claim 12, wherein all codewords included in the code table of the code table holding circuitry are not "0".

18. The system according to claim 12, wherein the at least one control chip, the at least one quantization processing chip, the at least one dot product processing chip, the at least one interface chip, the at least one mode setting chip, the at least one integer calculation processing chip, the at least one real number processing chip, and the at least one code table holding chip are integrated together into one or more chips.

19. The system according to claim 14, wherein the at least one control chip, the at least one quantization processing chip, the at least one dot product processing chip, the at least one interface chip, the at least one mode setting chip, the at least one integer calculation processing chip, the at least one real number processing chip, the at least one code table holding chip, and the at least one loop count obtaining chip are integrated together into one or more chips.

20. The system according to claim 12, wherein the system includes an embedded device or a mobile device including the processor for the neural network.

* * * * *